United States Patent
Nakagomi

(10) Patent No.: US 10,388,018 B2
(45) Date of Patent: Aug. 20, 2019

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Keita Nakagomi, Kyoto (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 109 days.

(21) Appl. No.: 15/484,400

(22) Filed: Apr. 11, 2017

(65) Prior Publication Data

US 2017/0301093 A1 Oct. 19, 2017

(30) Foreign Application Priority Data

Apr. 13, 2016 (JP) .................. 2016-080477
Aug. 31, 2016 (JP) .................. 2016-170070

(51) Int. Cl.
*A61B 6/00* (2006.01)
*G06T 7/00* (2017.01)
*G06T 7/33* (2017.01)
*G06T 5/50* (2006.01)
*G06T 7/254* (2017.01)
*A61B 5/00* (2006.01)

(52) U.S. Cl.
CPC .............. *G06T 7/0016* (2013.01); *G06T 5/50* (2013.01); *G06T 7/254* (2017.01); *G06T 7/337* (2017.01); *G06T 2207/10081* (2013.01); *G06T 2207/20216* (2013.01); *G06T 2207/20224* (2013.01); *G06T 2207/30008* (2013.01); *G06T 2207/30056* (2013.01); *G06T 2207/30061* (2013.01)

(58) Field of Classification Search
CPC .................................... G06T 7/00; G06K 9/00
USPC .................................................. 382/128–131
See application file for complete search history.

(56) References Cited

U.S. PATENT DOCUMENTS

| 5,611,000 A | * | 3/1997 | Szeliski | G06K 9/6203 382/294 |
| 8,331,654 B2 | * | 12/2012 | Abraham | G06T 7/285 382/154 |
| 9,275,439 B2 | * | 3/2016 | Miyamoto | G06T 5/003 |

(Continued)

FOREIGN PATENT DOCUMENTS

| JP | 2014094036 A | 5/2014 |
| WO | 0250771 A1 | 6/2002 |

OTHER PUBLICATIONS

Partial European Search Report issued in European Appln. No. 17164941.1 dated Nov. 10, 2017.

(Continued)

*Primary Examiner* — Abolfazl Tabatabai
(74) *Attorney, Agent, or Firm* — Rossi, Kimms & McDowell LLP

(57) ABSTRACT

An image processing apparatus includes: an obtaining unit configured to obtain a first image of an object and a second image of the object; a difference unit configured to obtain a difference image after the first image and the second image are registered; and a change unit configured to perform processing of changing a pixel value in the difference image based on a likelihood calculated using a pixel value in the first image and a pixel value in the second image.

29 Claims, 11 Drawing Sheets

(56) References Cited

U.S. PATENT DOCUMENTS

2003/0156758 A1    8/2003  Bromiley et al.
2009/0310843 A1*  12/2009  Moriya .................. A61B 6/032
                                                     382/131

OTHER PUBLICATIONS

Kang et al. "A New Accurate and Precise 3-D Segmentation Method for Skeletal Structures in Volumetric CT Data." IEEE Transactions on Medical Imaging. May 2003: 586-598. vol. 22, No. 5.
Extended European Search Report issued in European Appln. No. 17164941.1 dated Feb. 21, 2018.
Chen et al. "An Automatic Diagnostic System for CT Liver Image Classification." IEEE Transactions on Biomedical Engineering. Jun. 1998: 783-794. vol. 45, No. 6.

* cited by examiner

FIG. 10
PIXELS AS TARGETS IN FIRST CALCULATION:
PIXEL (2, 3) OF INTEREST
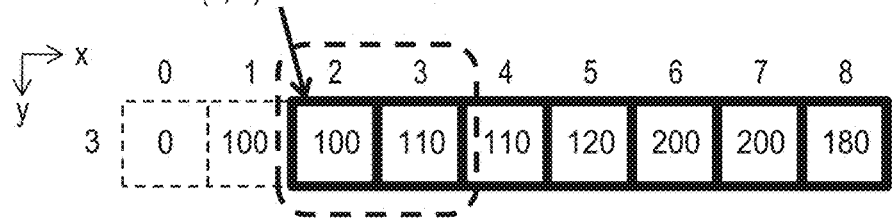
PIXELS AS TARGETS IN SECOND CALCULATION
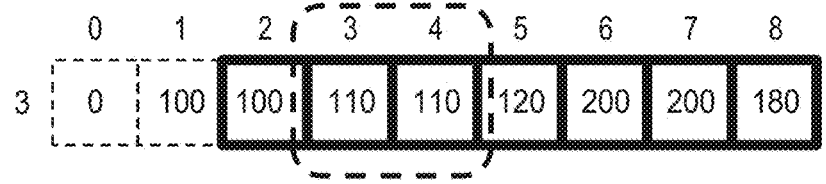
PIXELS AS TARGETS IN THIRD CALCULATION
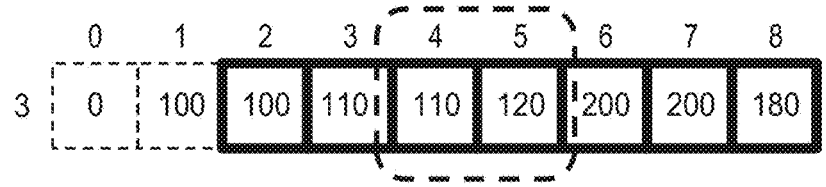
PIXELS AS TARGETS IN FOURTH CALCULATION
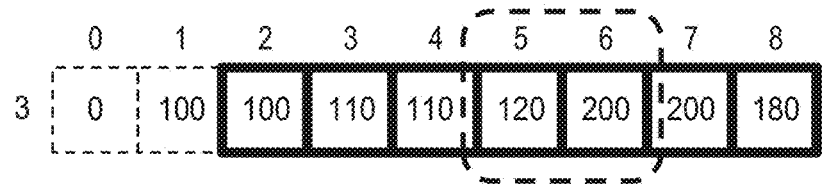

PATH EXAMPLE 1

PATH EXAMPLE 2

PATH EXAMPLE 3

PATH EXAMPLE 4

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, an image processing method, and a storage medium.

Description of the Related Art

In the medical field, diagnosis is performed using images obtained by various types of medical imaging apparatuses (modalities) such as a computed tomography apparatus (to be referred to as a CT (Computed Tomography) apparatus hereinafter). Especially, to capture a change in condition of an object with time, images obtained at different timings are compared. One of images to be compared will be referred to as a reference image hereinafter, and the other image will be referred to as a deformation target image hereinafter.

As image processing of visualizing a change with time between the reference image and the deformation target image, there is known a technique of obtaining an image (to be referred to as a difference image hereinafter) representing the difference between the images, that is, a subtraction technique. In the difference image, a changed portion between the two images is depicted and the remaining unchanged portion is expressed as a region having a uniform density value.

In the difference image, a region other than a region of interest of a doctor on the difference image may be depicted due to a difference in imaging condition between the reference image and the deformation target image or a change in condition of the object, thereby deteriorating the visibility of the region of interest. Japanese Patent Laid-Open No. 2014-94036 discloses a technique of adjusting the weights of pixel values on a difference image based on a noise region determined from one of a reference image and a deformation target image.

In the technique described in Japanese Patent Laid-Open No. 2014-94036, however, a noise region is determined from one of the reference image and the deformation target image regardless of the region of interest of the doctor, and the weights of the pixel values on the difference image are adjusted. Therefore, even in a region of non-interest of the doctor on the difference image, a change is depicted on the image, thereby deteriorating the visibility of the difference values in the region of interest of the doctor. In addition, since only one of the reference image and the deformation target image is considered when adjusting the weights of the pixel values, an operation of selecting one of these images, based on which the weights are to be adjusted, is necessary.

The present invention has been made in consideration of the above problems, and provides an image processing technique capable of adjusting the weights of pixel values on a difference image using the pixel values in a plurality of images. The present invention provides a technique of obtaining functions and effects that can be achieved by the respective arrangements in the mode for carrying out the invention to be described later but cannot be obtained by the related art.

SUMMARY OF THE INVENTION

According to one aspect of the present invention, there is provided an image processing apparatus comprising: an obtaining unit configured to obtain a first image of an object and a second image of the object; a difference unit configured to obtain a difference image after the first image and the second image are registered; and a change unit configured to perform processing of changing a pixel value in the difference image based on a likelihood calculated using a pixel value in the first image and a pixel value in the second image.

According to one aspect of the present invention, there is provided an image processing apparatus comprising: an obtaining unit configured to obtain a first image of an object and a second image of the object; a difference unit configured to obtain a difference image after the first image and the second image are registered; and a change unit configured to perform processing of changing a pixel value in the difference image based on comparison between a pixel value of each pixel in the first image and a pixel value of each pixel in the second image.

According to one aspect of the present invention, there is provided an image processing apparatus comprising: an obtaining unit configured to obtain a first image of an object and a second image of the object; a difference unit configured to obtain a difference image after the first image and the second image are registered; a display processing unit configured to display the first image and the second image on a display unit; and a change unit configured to perform processing of changing a pixel value in the difference image based on a display condition of the display unit.

According to another aspect of the present invention, there is provided an image processing method comprising: obtaining a first image of an object and a second image of the object; obtaining a difference image after the first image and the second image are registered; and performing processing of changing a pixel value in the difference image based on a likelihood calculated using a pixel value in the first image and a pixel value in the second image.

According to another aspect of the present invention, there is provided an image processing apparatus comprising: an obtaining unit configured to obtain an image of an object; and a feature amount obtaining unit configured to set, for a pixel of interest in the image, a plurality of predetermined paths passing through the pixel of interest, calculate, for each of the paths, an evaluation value representing continuity of pixel values on the path based on similarity between adjacent pixel values on the path, and obtain a feature amount of the pixel of interest based on the evaluation values obtained for the respective paths.

According to another aspect of the present invention, there is provided a computer-readable storage medium storing a program for causing a computer to execute steps of an image processing method, the method comprising: obtaining a first image of an object and a second image of the object; obtaining a difference image after the first image and the second image are registered; and performing processing of changing a pixel value in the difference image based on a likelihood calculated using a pixel value in the first image and a pixel value in the second image.

According to the present invention, it is possible to adjust the weights of pixel values on a difference image using the pixel values in a plurality of images. Furthermore, according to the present invention, when adjusting the weights of the pixel values, an operation of selecting a reference image to be used to adjust the weights is unnecessary, thereby reducing the load on a doctor as a user.

Further features of the present invention will become apparent from the following description of exemplary embodiments (with reference to the attached drawings).

BRIEF DESCRIPTION OF THE DRAWINGS

FIG. 10 is a view for explaining an example of processing of enhancing the massive region.

DESCRIPTION OF THE EMBODIMENTS

Embodiments of the present invention will now be exemplarily described in detail with reference to the accompanying drawings. Note that the constituent elements described in the embodiments are merely examples. The technical scope of the present invention is determined by the scope of claims and is not limited by the following individual embodiments.

First Embodiment

An image processing apparatus according to the first embodiment obtains a difference image between a plurality of images (a reference image and a deformation target image), and executes image processing for appropriately adjusting the weights of pixel values on the difference image. The image processing apparatus is characterized by, during a process of obtaining the difference image and executing the image processing, obtaining, from a pixel value in the reference image and that in the deformation target image having undergone deformable registration with the reference image, an index (likelihood) of being a pixel included in a region of interest of the user such as a doctor, and using the obtained index (likelihood) as a weight for the difference value.

In this technique, for example, it is possible to improve the visibility of difference values in a region of interest of the user by setting weights for pixels included in the region of interest larger than those for pixels in a region of non-interest of the user on the difference image. Alternatively, it is possible to relatively improve the visibility of difference values in a region of interest of the user by setting weights for pixels included in a region of non-interest of the user smaller than those for pixels in the region of interest.

Figure 1:
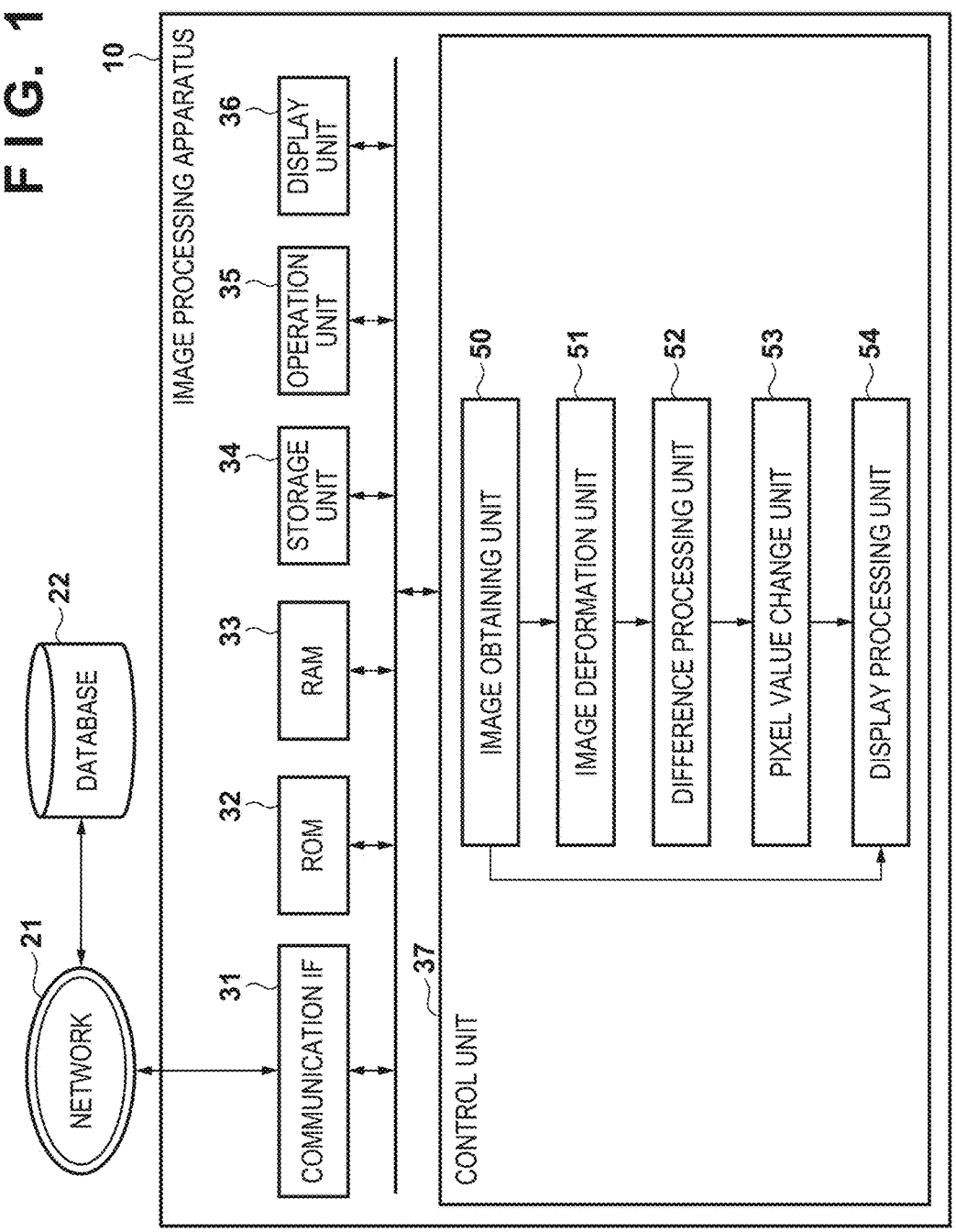
FIG. 1 is a block diagram showing the functional arrangement of an image processing apparatus according to an embodiment.

The arrangement and processing of the image processing apparatus according to this embodiment will be described below with reference to FIG. 1. FIG. 1 is a block diagram showing an example of the arrangement of an image processing system (medical image processing system) including the image processing apparatus according to this embodiment. The image processing system includes, as its functional components, an image processing apparatus 10, a network 21, and a database 22. The image processing apparatus 10 is communicably connected to the database 22 via the network 21. The network 21 includes, for example, a LAN (Local Area Network) and a WAN (Wide Area Network).

The database 22 holds and manages medical images and pieces of information associated with the medical images. The image processing apparatus 10 can obtain, via the network 21, the medical image held in the database 22. The image processing apparatus 10 includes a communication IF (interface) 31 (communication unit), a ROM (Read Only Memory) 32, a RAM (Random Access Memory) 33, a storage unit 34, an operation unit 35, a display unit 36, and a control unit 37.

The communication IF 31 (communication unit) is formed by a LAN card or the like, and implements communication between an external apparatus (for example, the database 22 or the like) and the image processing apparatus 10. The ROM 32 is formed by a nonvolatile memory or the like, and stores various programs. The RAM 33 is formed by a volatile memory or the like, and temporarily stores various kinds of information as data. The storage unit 34 is formed by an HDD (Hard Disk Drive) or the like, and stores various kinds of information as data. The operation unit 35 is formed by a keyboard and mouse, a touch panel, or the like, and inputs instructions from the user (for example, a doctor) to various apparatuses.

The display unit 36 is formed by a display or the like, and displays various kinds of information to the user. The control unit 37 is formed by a CPU (Central Processing Unit) or the like, and comprehensively controls processing in the image processing apparatus 10. The control unit 37 includes, as its functional components, an image obtaining unit 50, an image deformation unit 51, a difference processing unit 52, a pixel value change unit 53, and a display processing unit 54.

In the image processing apparatus according to this embodiment, the image obtaining unit 50 obtains the first image of an object and the second image of the object. The first and second images are images obtained at different timings. The image obtaining unit 50 obtains a first image I1 (reference image) and a second image I2 (deformation target image) from the database 22. These images are images (medical images) of the object, which are obtained by various modalities. This embodiment will describe an example in which the medical images are CT images obtained at different dates and times. However, the medical images may be another kind of images. This embodiment is applicable regardless of the kind of images.

The image deformation unit 51 registers the first and second images by deforming, based on the correspondence between the position of each pixel in the first image and that of each pixel in the second image, the second image so that each pixel in the second image matches a corresponding pixel in the first image. That is, the image deformation unit 51 registers the first and second images by obtaining the correspondence between the position of each pixel in the first image I1 (reference image) and that of each pixel in the second image I2 (deformation target image), and deforming, based on the correspondence, the second image I2 so that each pixel in the second image I2 matches a corresponding pixel in the first image I1. The deformation processing result of the second image I2 will be referred to as an image I2' (second image I2') hereinafter. To calculate the correspondence, an existing linear deformation algorithm, an existing nonlinear deformation algorithm, or a combination thereof may be used. By performing deformable registration between the images by the image deformation unit 51, a feature point indicating a characteristic portion included in the first image I1 and a feature point indicating a characteristic portion included in the second image I2 (second image I2') can be registered.

The difference processing unit 52 obtains a difference image after the first and second images are registered. The difference processing unit 52 obtains pixel values at corresponding positions from the registered images, and obtains a difference image TS by performing difference processing for the obtained pixel values. That is, the difference processing unit 52 obtains the pixel values of pixels at the identical positions in the first image I1 and the second image I2', performs difference processing between the two pixel values, and outputs the calculation result as the difference image TS to the pixel value change unit 53. Difference processing of subtracting the pixel value in the second image I2' from the pixel value in the first image I1 will be described below. Conversely, difference processing of subtracting the pixel value in the image I1 from the pixel value in the second image I2' may be adopted.

Based on a likelihood calculated using a pixel value in the first image and that in the second image, the pixel value change unit 53 performs processing of changing a pixel value in the difference image. The pixel value change unit 53 performs processing of changing the pixel value of each pixel in the difference image TS based on a likelihood calculated from the first image I1 and the second deformation image I2' using distribution information of pixel values in learning data (distribution information indicating the distribution of pixel values in a region of interest of the user) associated with information (pixel value information) about the range of the pixel values in the region of interest.

The information (pixel value information) about the range of the pixel values of interest of the user may be input by the user via the operation unit 35 or automatically determined from the first image I1 and/or the second image I2 displayed on the display unit 36. For example, the pixel value change unit 53 can obtain, in each pixel in the difference image, the pixel value information about the range of the pixel values in the region of interest based on the information input via the operation unit 35. In addition, the pixel value change unit 53 can obtain, in each pixel in the difference image, the pixel value information about the range of the pixel values in the region of interest based on the display condition of the display unit 36. The pixel value change unit 53 can obtain the pixel value information about the range of the pixel values in the region of interest based on the display condition of at least one of the first and second images.

The pixel value change unit 53 sets distribution information indicating the distribution of the pixel values in the region of interest based on the obtained pixel value information. The storage unit 34 stores the distribution information of the pixel values in the learning data (the distribution information indicating the distribution of the pixel values in the region of interest), and the pixel value change unit 53 sets distribution information based on the distribution information obtained from the storage unit 34 based on the pixel value information. The distribution information of the pixel values in the learning data (the distribution information indicating the distribution of the pixel values in the region of interest) corresponds to each portion (for example, a lung, bone, liver, or the like) of the object, and is stored in the storage unit 34 as information indicating a different distribution of pixel values. The pixel value information in the region of interest is associated with the distribution information of the pixel values in the learning data (the distribution information indicating the distribution of the pixel values in the region of interest). For example, if the pixel value change unit 53 obtains pixel value information about a bone region as a region of interest, the distribution information of the pixel values in the learning data (the distribution information indicating the distribution of the pixel values in the region of interest), which corresponds to the bone portion, is obtained from the storage unit 34, and set as a likelihood calculation condition (θ). The pixel value change unit 53 performs processing of changing the pixel value in the difference image based on the likelihood calculated using the pixel value in the first image and that in the second image.

Note that the distribution information of the pixel values in the learning data (the distribution information indicating the distribution of the pixel values in the region of interest) is information which can be obtained when various modalities obtain images. The distribution information of the pixel values in the learning data (the distribution information indicating the distribution of the pixel values in the region of interest) may be stored in the database 22 together with the image (medical image) of the object. In this case, the image obtaining unit 50 can obtain the distribution information of the pixel values in the learning data (the distribution information indicating the distribution of the pixel values in the region of interest) from the database 22, and store it in the storage unit 34.

Next, the pixel value change unit 53 outputs, to the display processing unit 54, a result of performing processing of changing the pixel values in the difference image TS. The difference image for which the pixel value change processing has been executed based on the likelihood will be referred to as a difference image TS' hereinafter.

The display processing unit 54 functions as a display control unit for controlling the display of the display unit 36. The display processing unit 54 displays the difference image TS' calculated by the pixel value change unit 53 in the image display region of the display unit 36. The display processing unit 54 may display, in the image display region of the display unit 36, the first image I1 and second image I2 both of which have been obtained by the image obtaining unit 50, the second image I2' deformed by the image deformation unit 51, and the difference image TS calculated by the difference processing unit 52. For example, the display processing unit 54 can control the display of the display unit 36 to display the difference images TS' and TS, the first image I1, and the second image I2 (I2') side by side or superimpose and display some of the images.

The respective components of the image processing apparatus 10 function in accordance with computer programs. For example, the control unit 37 (CPU) uses the RAM 33 as a work area to load computer programs stored in the ROM 32 or the storage unit 34, and executes them, thereby implementing the functions of the respective components. Note that some or all of the functions of the components of the image processing apparatus 10 may be implemented using a dedicated circuit. Alternatively, some of the functions of the components of the control unit 37 may be implemented using a cloud computer.

For example, an operation apparatus existing in a location different from that of the image processing apparatus 10 may be communicably connected to the image processing apparatus 10 via the network 21. Then, the functions of the components of the image processing apparatus 10 or the control unit 37 may be implemented by transmitting/receiving data between the image processing apparatus 10 and the operation apparatus.

Figure 2:
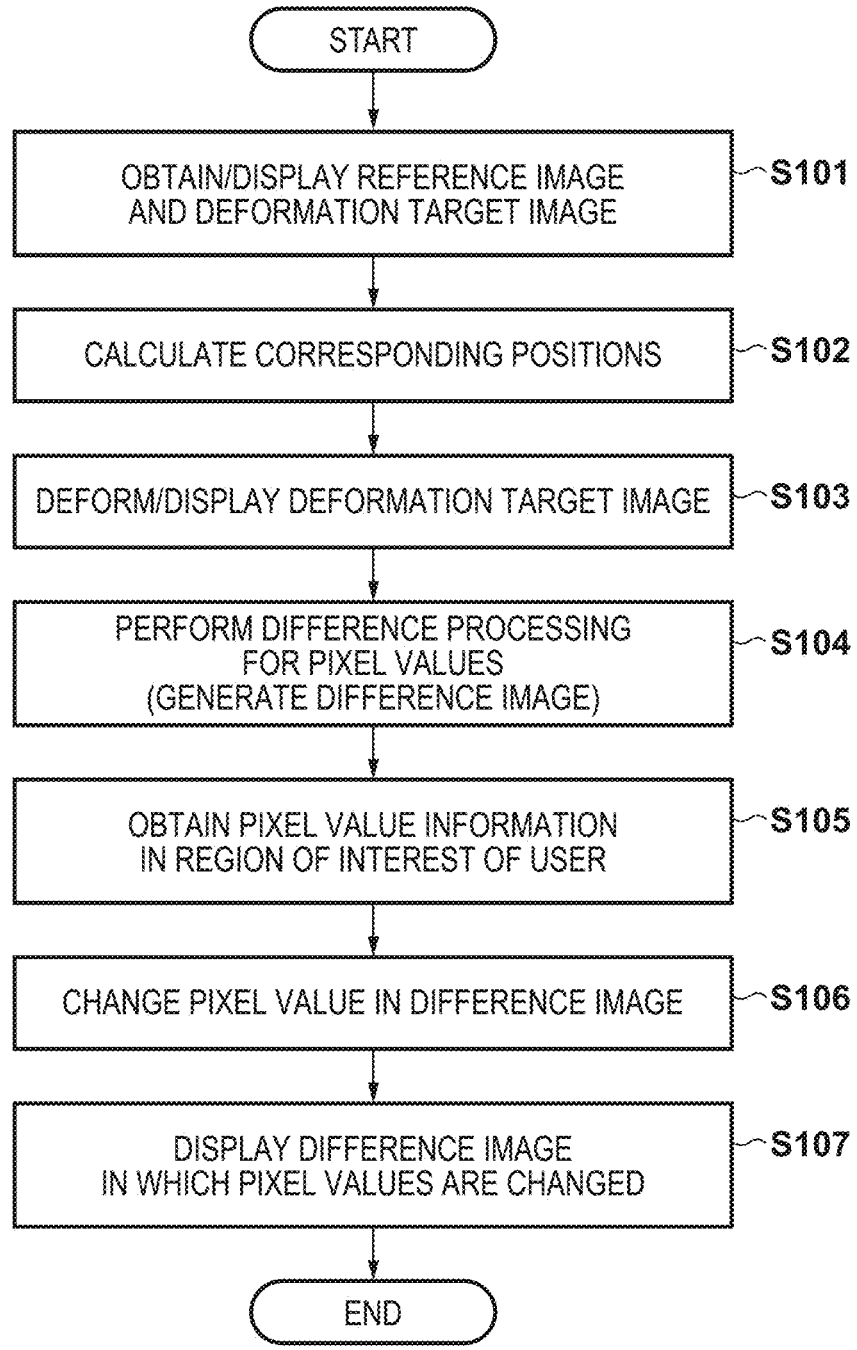
FIG. 2 is a flowchart illustrating an example of the processing procedure of the image processing apparatus.

An example of the processing of the image processing apparatus 10 shown in FIG. 1 will be described next with reference to FIGS. 2 to 6. FIG. 2 is a flowchart illustrating an example of the processing procedure of the image processing apparatus 10. This embodiment will exemplify medical images each including bones. However, this embodiment is applicable to medical images each including another portion of interest such as lungs, a brain, or a liver.

(Step S101: Obtaining/Display of Images)

Figure 3:
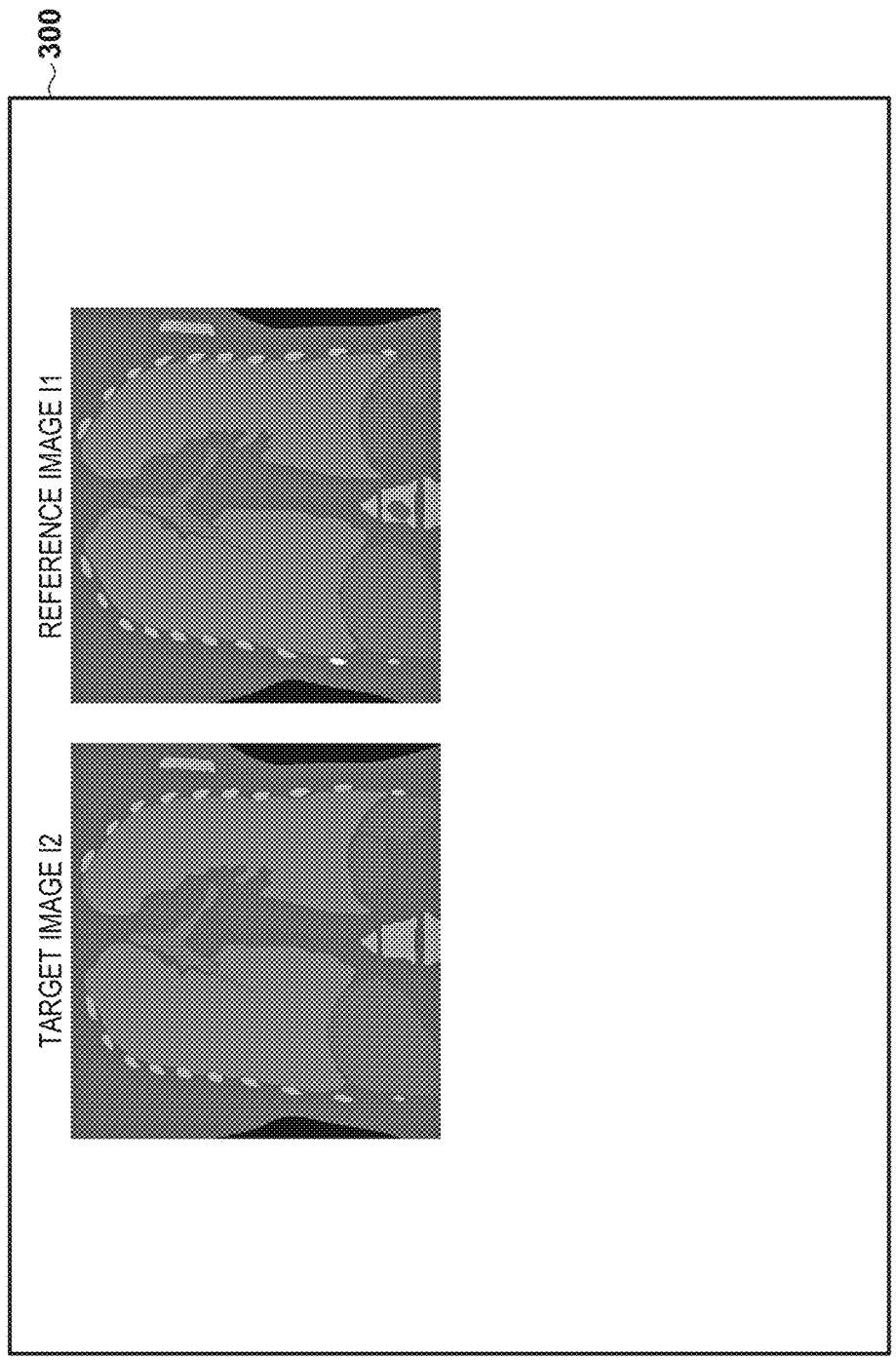
FIG. 3 is a view showing a display example of an image obtained by an image obtaining unit.

In step S101, if the user instructs to obtain the reference image (first image I1) and the deformation target image (second image I2) via the operation unit 35, the image obtaining unit 50 obtains, from the database 22, the plurality of images (the reference image (first image I1) and the deformation target image (second image I2)) designated by the user, and stores them in the RAM 33. Furthermore, as shown in FIG. 3, the display processing unit 54 displays, in an image display region 300 of the display unit 36, the plurality of images (the reference image (first image I1) and the deformation target image (second image I2)) obtained from the database 22.

(Step S102: Deformable Registration, Step S103: Image Deformation)

In step S102, the image deformation unit 51 reads out the images from the RAM 33, and calculates the correspondence between each pixel in the first image I1 and each pixel in the second image I2. More specifically, the image deformation unit 51 calculates a deformation vector indicating the correspondence from each pixel in the first image I1 to each pixel in the second image I2. The deformation vector is a vector indicating a virtual moving amount (displacement amount) and moving direction (deformation direction) to each pixel in the deformation target image (second image I2), which corresponds to each pixel in the reference image (first image I1). For example, in the case of three-dimensional images, if coordinates (x1, y1, z1) of each pixel in the reference image (first image I1) move to coordinates (x2, y2, z2) of each pixel in the deformation target image (second image I2), the deformation vector is represented by (x2−x1, y2−y1, z2−z1).

Note that calculation of a deformation vector between the corresponding positions in the images may be executed by a linear image deformable registration method such as affine transformation, a nonlinear image deformable registration method such as LDDMM (Large Deformation Diffeomorphic Metric Mapping), or a combination thereof. The plurality of images obtained by the image obtaining unit 50 may be images other than original images obtained by various modalities. For example, output images of various image enhancement filters such as an edge enhancement filter, a region image obtained by extracting a region of interest, and a combination of these images may be used.

In step S103, the image deformation unit 51 generates second image I2' from the second image I2 using the deformation vector obtained in step S102 so that each pixel in the first image I1 matches a corresponding pixel in the deformation target image (second image I2), and stores the generated image in the RAM 33. The display processing unit 54 displays, in the image display region of the display unit 36, the second image I2' generated by the image deformation unit 51.

Note that if positions (pixels) of the object included in the first image I1 and the second image I2 correspond to each other at first, the processes in steps S102 and S103 can be skipped.

(Step S104: Difference Processing between Pixel Values (Generation of Difference Image))

In step S104, the difference processing unit 52 reads out the first image I1 and the second image I2' from the RAM 33, generates the difference image TS by performing difference processing between the pixel values of pixels at corresponding positions in the first image I1 and the second image I2', and stores the generated image in the RAM 33.

(Step S105: Obtaining of Pixel Value Information in Region of Interest of User)

In step S105, the pixel value change unit 53 obtains information (pixel value information) about the range of pixel values of interest of the user. The pixel value change unit 53 obtains information (pixel value information) about the range of the pixel values in the region of interest of the user based on the display conditions of the images displayed on the display unit 36. More specifically, the pixel value change unit 53 estimates pixel value information in the region of interest of the user based on the display conditions of the images (the first image I1 and the second image I2 or I2') displayed on the display unit 36 in step S101 or S103, for example, setting values such as a window level (WL) and window width (WW) for density value conversion.

When the doctor as the user performs image diagnosis of CT images, he/she changes (converts the density values in the display images) the settings of the display conditions of the images corresponding to a portion of the object, to which the doctor pays attention, by changing the window level (WL) and window width (WW) depending on the portion of the object, to which the doctor pays attention. More specifically, for example, if the doctor performs image diagnosis of a bone, the window level (WL) is set to a value between 350 to 500 [H.U.], and the window width (WW) is set to a value between 1,500 to 2,500 [H.U.]. By changing the settings of the display conditions of the images in accordance with the portion of the object, a display image having a density distribution which makes it easy to see the portion (for example, a bone) of the object, to which the doctor pays attention, is displayed.

By using this, the pixel value change unit 53 can estimate the range of the pixel values of interest of the doctor as the user and/or the portion (organ) of the object based on the setting values of the image display conditions (for example, the window level (WL) and window width (WW)) of the display unit 36 on which the images (the first image I1 and the second image I2 or I2') to undergo difference processing are displayed.

Note that if the settings of the window level (WL) and window width (WW) are different between the first image I1 and the second image I2', it is desirable to use the setting values of the reference image (first image I1) serving as a reference for deformable registration between the images but the setting values for the second image I2' may be used. The pixel value change unit 53 can obtain the pixel value information about the range of the pixel values in the region of interest based on the display condition of at least one of the first and second images.

The pixel value information of interest of the user may be input from the user via the operation unit 35. In each pixel in the difference image, the pixel value change unit 53 can obtain the pixel value information about the range of the pixel values in the region of interest based on the information input via the operation unit 35. The pixel value change unit 53 may obtain, from the storage destination, predetermined (determined in advance) pixel value information stored in the ROM 32 or the RAM 33.

(Step S106: Change of Pixel Value in Difference Image (Image Subtraction Operation Result))

In step S106, the pixel value change unit 53 changes the pixel value of each pixel in the difference image TS based on the likelihood calculated from the first image I1 and the second image I2' using, as the likelihood calculation condition (θ), the distribution information of the pixel values in the learning data (the distribution information indicating the distribution of the pixel values in the region of interest) associated with the pixel value information of interest of the user, thereby generating the difference image TS'.

The likelihood calculated from the first image I1 and the second image I2' is information indicating the possibility that a pixel at a position (identical coordinates) in the first image I1 and/or the second image I2 (I2'), which corresponds to a position in the difference image TS, is included in the region of interest of the user.

To calculate the likelihood of a pixel value, the distribution of the pixel values is assumed to be a normal distribution, and the pixel value change unit 53 calculates the likelihood of the pixel value using the distribution information indicating the distribution of the pixel values in the region of interest. The pixel value change unit 53 obtains in advance the parameters (average and variance) of the normal distribution from the known learning data as the distribution information indicating the distribution of the pixel values in the region of interest, and calculates, by using the obtained distribution information (the parameters of the normal distribution) as the likelihood calculation condition (θ), the likelihood for each pixel in the image to be processed. To do this, before performing likelihood calculation, the pixel value change unit 53 obtains the parameters of the normal distribution as the distribution information indicating the distribution of the pixel values in the region of interest from the learning data.

For example, in the case of the CT images, the pixel value change unit 53 obtains the parameters of the normal distribution as the distribution information indicating the distribution of the pixel values in the region of interest for each portion (organ) existing in each density range, such as a lung region containing a lot of air, an abdominal organ including a liver mainly constituted by soft tissue, or a bone.

In likelihood calculation according to this embodiment, the pixel value change unit 53 sets, as the likelihood calculation condition (θ), the distribution information of the pixel values in the learning data (the distribution information indicating the distribution of the pixel values in the region of interest) associated with the pixel value information of the region of interest of the user, and performs processing of changing a pixel value in the difference image based on a likelihood calculated using a pixel value in the first image and a pixel value in the second image. More specifically, the pixel value change unit 53 uses the likelihood as a weight for the pixel value (difference value) in the difference image. The pixel value change unit 53 changes the pixel value in the difference image using a weighted coefficient obtained based on the likelihood. The pixel value change unit 53 sets difference values in the region including the pixel values of interest of the user to be relatively larger than difference values in the remaining region. This can enhance only a change the user wants to capture, thereby improving the visibility of the difference image.

Figure 4:
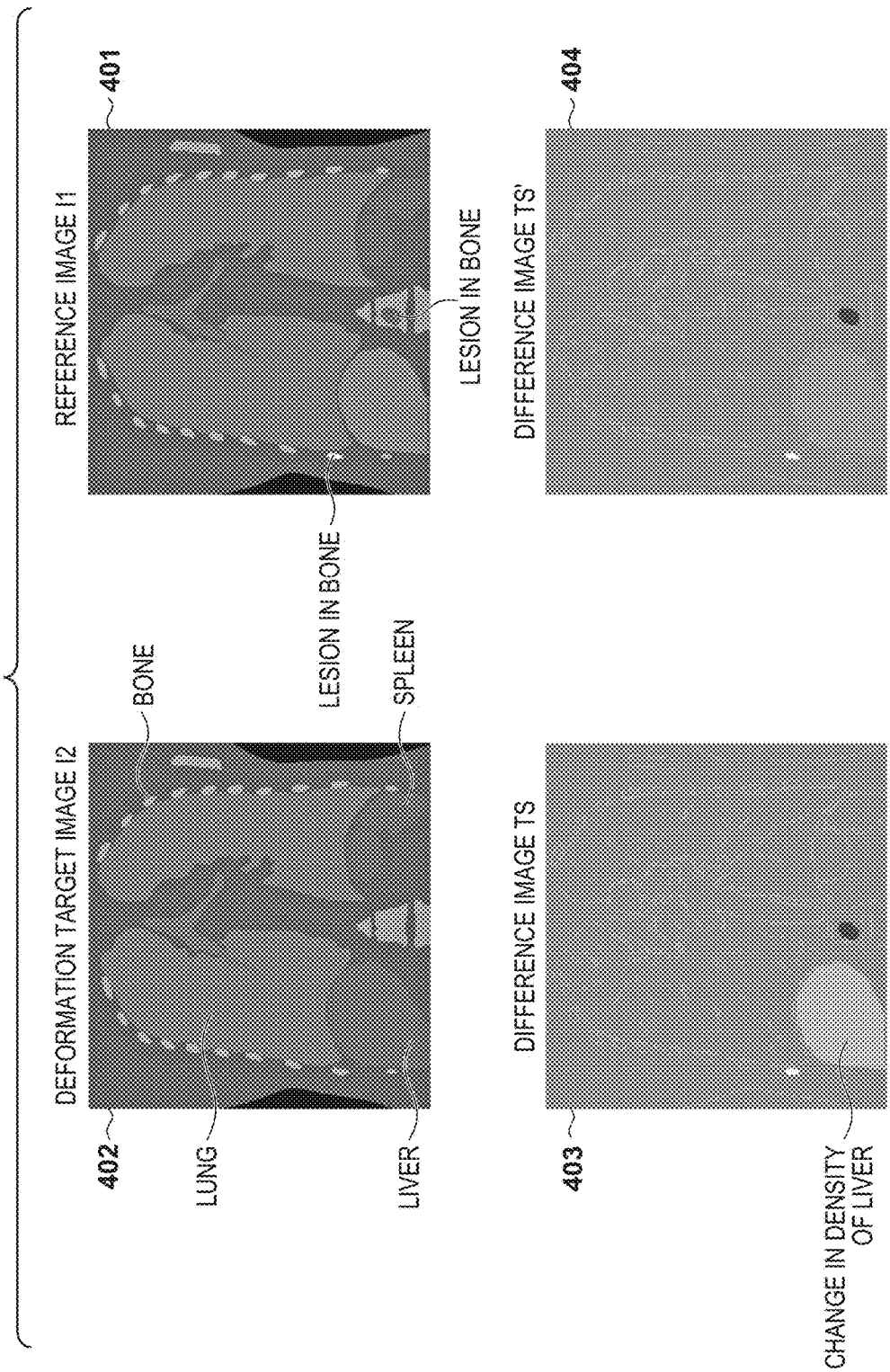
FIG. 4 is a view showing an example in which each pixel value in a difference image is changed based on a likelihood of being a pixel included in a region of interest of the user.

FIG. 4 shows an image display example when the region of interest of the user is a bone. Referring to FIG. 4, a difference image TS 403 is an image obtained based on the difference between a reference image 401 (the first image I1) and a deformation target image 402 (the second image I2) both of which are shown in FIG. 4, and a difference image TS' 404 is a difference image obtained by executing pixel value change processing. In the difference images TS and TS' of FIG. 4, a positive difference value, a negative difference value, and a difference value of 0 are represented by white, black, and gray, respectively. Dotted lines indicate the contours of a portion region (organ region). However, the portion region (organ region) is not necessarily depicted on the difference image. The example of FIG. 4 shows a case when distribution information (parameters) indicating the distribution of pixel values in the bone region is obtained from the learning data for the bone region as the portion region of interest of the user. In this case, a weight for the difference value between pixels highly probably included in the portion region (bone region) of interest of the user is set to be larger than a weight for the difference value between pixels in the remaining region based on a likelihood calculated using the distribution information (parameters), and the pixel values are converted. As described above, it is possible to suppress depiction of a change with time in a region (for example, an abdominal organ) other than the portion region of interest of the user by enhancing the difference value between pixels highly probably included in the portion region (bone region) of interest of the user.

In this embodiment, the pixel value change unit 53 defines, based on the likelihood obtained from the first image I1 and the second image I2', a weighted coefficient W(p) to be used for multiplication to change the pixel value of a pixel p in the difference image TS, as given by equation (1) below. The pixel value change unit 53 performs processing of changing a pixel value in the difference image based on a larger one of a likelihood $Pr(I1(p)|\theta)$ calculated using a pixel value ($I1(p)$) in the first image and the distribution information (θ) indicating the distribution of the pixel values in the region of interest and a likelihood $Pr(I2'(p)|\theta)$ calculated using a pixel value ($I2'(p)$) in the second image and the distribution information (θ) indicating the distribution of the pixel values in the region of interest.

$$W(p)=\max(Pr(I1(p)|\theta), Pr(I2'(p)|\theta)) \quad (1)$$

where the function max(A, B) is a function of extracting the maximum value of arguments A and B, and $Pr(C|D)$ represents the probability (likelihood) that condition C is obtained when condition D is given. In addition, $I1(p)$ represents the pixel value of the pixel p in the first image I1, and $I2'(p)$ represents the pixel value of the pixel p in the second image I2'. If the second image I2 is not deformed, $I2'(p)$ represents the pixel value in the second image I2.

Furthermore, assume that θ indicates the distribution information (parameters) indicating the distribution of the pixel values in the region of interest, which is obtained from the learning data. Then, the pixel value change unit 53 changes, for each of all the pixels in the difference image TS, the pixel value by multiplying the pixel value TS(p) in the difference image TS by the weighted coefficient W(p), and stores, in the RAM 33, the difference image TS' as the processing result obtained by executing the pixel value change processing.

The reason why both the images (first image I1 and second image I2') as the calculation sources of the difference image TS are used in equation (1) for calculating the weighted coefficient W(p) is to prevent the difference values in the region of interest on the difference image from being erroneously suppressed.

If, for example, the weighted coefficient W(p) is calculated using only one of the images, if there is a pixel which has a high likelihood in one image but has a low likelihood in the other image, the weight may become small. More specifically, if a difference with time between images captured at a given period is targeted, a pixel having a density value representing a normal organ structure in one image may have a pixel value falling outside the range of normal pixel values in the other image due to a lesion. Therefore, in this case, if the weight is calculated using the image including the lesion, the weight at the corresponding pixel becomes small.

To the contrary, if the weighted coefficient W(p) is calculated using both the images as the calculation sources of the difference image TS, if a pixel value falls within the likelihood range in at least one of the images, it is possible to give a large weight to a change (difference value) in the pixel in the region of interest of the user. Furthermore, if both the images are used, when calculating the weighted coefficient W(p), a step of selecting one of the first image I1 and the second image I2' is unnecessary.

In the example shown in FIG. 4, in the difference image TS as the simple difference between the first image I1 and the second image I2', in addition to the portion region (bone region) as the region of interest of the user, another portion region (liver region) as a region of non-interest of the user remains as difference values. A CT value in the liver region generally falls within the range of 60 to 70 [H.U.], and a CT value in the bone region is equal to or larger than 150 [H.U.]. Therefore, by learning the distribution information (parameters) θ indicating the distribution of the pixel values related to the bone region in the learning data, Pr(I1($p$)|θ) and Pr(I2'($p$)|θ) in the bone region are higher than those in the liver region. Thus, in the result (that is, TS'(p)) of multiplying the pixel value TS(p) in the difference image TS by the weighted coefficient W(p), the pixel value TS'(p) in the other portion region (liver region) has a difference value close to 0, as compared with the pixel value TS'(p) in the portion region (bone region) as the region of interest of the user. As a result, like the difference image TS' shown in FIG. 4, the difference values in the other portion region (liver region) are suppressed, and the difference values in the portion region (bone region) as the region of interest of the user are relatively enhanced, thereby making it easier to visually perceive a change in bone as the region of interest.

Note that the use of both the images as the calculation sources of the difference image at the time of calculation of the weighted coefficient W(p) has the following advantage. That is, as the feature of the difference image TS, an error in calculation of corresponding positions in the images performed in steps S102 and S103 can be clearly visualized. This feature will be described in detail with reference to FIG. 5. Note that in difference images shown in FIG. 5, a positive difference value, a negative difference value, and a difference value of 0 are represented by white, black, and gray, respectively, similarly to FIG. 4. Assume that the region of interest of the user is a bone region in FIG. 5.

Figure 5:
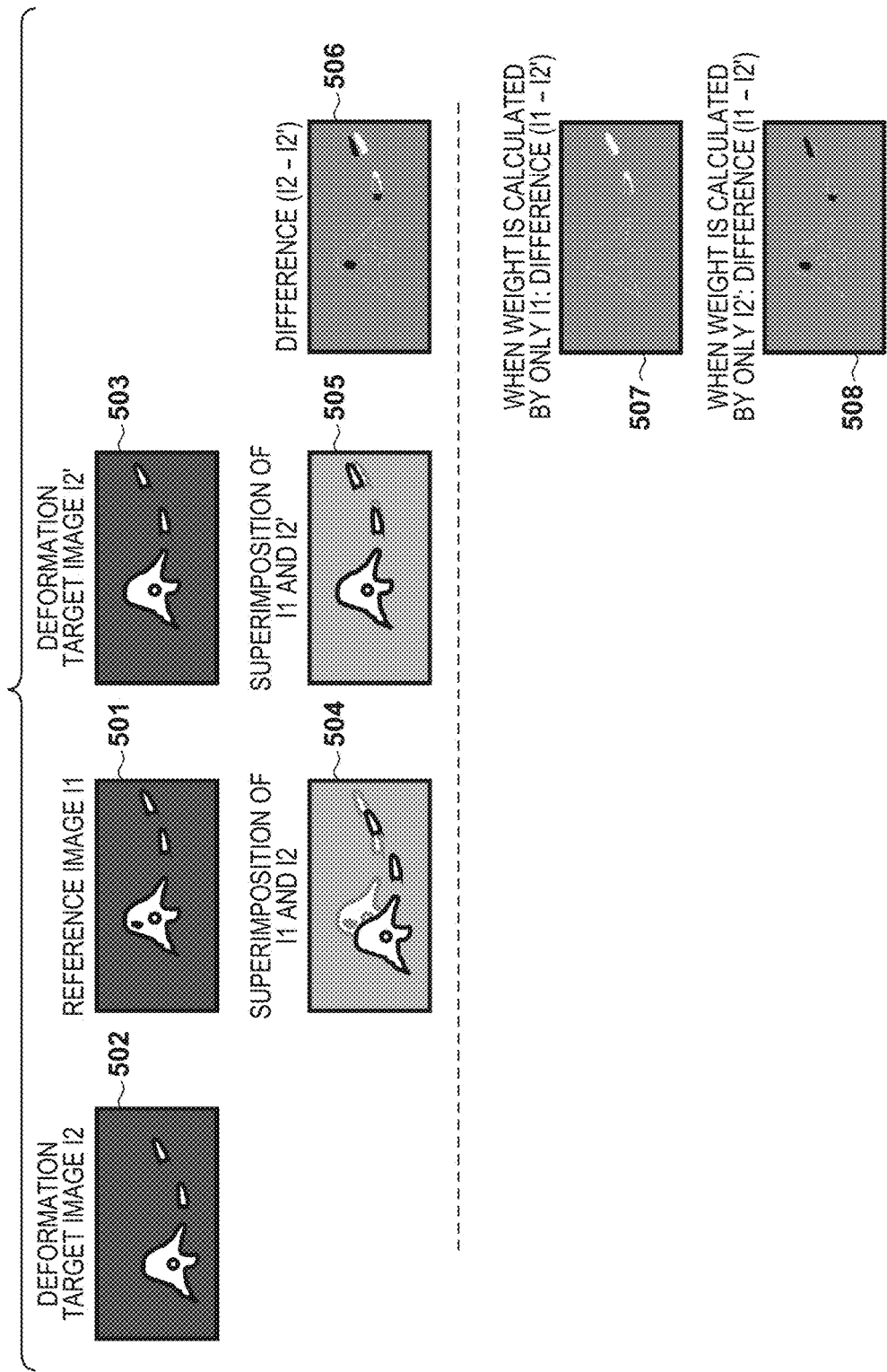
FIG. 5 is a view showing examples of a difference image when a positional shift occurs in a result of detecting corresponding positions between images.

Referring to FIG. 5, an image 501 is a reference image (first image I1), an image 502 is a deformation target image (second image I2), and an image 503 is a deformation target image (second image I2'). An image 504 shows the superimposed image of the image 501 (reference image (first image I1)) and the image 502 (deformation target image (second image I2)). An image 505 shows the superimposed image of the image 501 (reference image (first image I1)) and the deformation target image (second image I2').

An image 506 exemplifies the difference image TS' as the processing result of calculating a weighted coefficient using both the images (first image I1 and second image I2') as the calculation sources of the difference image, and changing each pixel value in the difference image by multiplying the pixel value by the weighted coefficient.

As shown in the image 506 (difference image) of FIG. 5, positive and negative values are depicted to be close to each other on the difference image with respect to a location where a small positional shift occurs in detection of the corresponding positions in the images. When the user sees the depiction result of the difference values on the image, for example, a location where positive and negative pixel values are locally inverted, he/she can identify a location where the pixel value has been truly changed and an error location where a positional shift has occurred in the corresponding position detection result between the images.

An image 507 exemplifies the difference image TS' as the processing result of calculating a weighted coefficient using one (first image I1) of the images as the calculation sources of the difference image, and changing each pixel value in the difference image by multiplying the pixel value by the weighted coefficient. An image 508 exemplifies the difference image TS' as the processing result of calculating the weighted coefficient using one (second image I2') of the images as the calculation sources of the difference image, and changing each pixel value in the difference image by multiplying the pixel value by the weighted coefficient.

If a positional shift occurs in the corresponding position detection result between the images, as described above, it is considered that with respect to pixels at the identical coordinate points in the first image I1 and second image I2', the pixel in one image has a high bone likelihood and the pixel in the other image has a low bone likelihood. Therefore, if a weight for the difference value is determined using only the likelihood calculated from one of the images, the weight for one of the difference values is unwantedly small, as shown in the images 507 and 508. Consequently, the feature in which the positive and negative values exist close to each other on the difference image is lost, and it is thus difficult to identify a location where the pixel value has been truly changed and the error location of the corresponding position detection result.

On the other hand, if the weight is calculated using both the images used at the time of calculation of the difference values (the image 506 of FIG. 5), the feature in which the positive and negative values exist close to each other is maintained. Therefore, calculation of the weighted coefficient using both the image (first image I1 and second image I2') as the calculation sources of the difference image TS has the effect of maintaining the feature of ease of error identification of the corresponding position detection result of the difference image TS, as shown in the image 506 of FIG. 5.

(Step S107: Output Display of Calculation Result)

Figure 6:
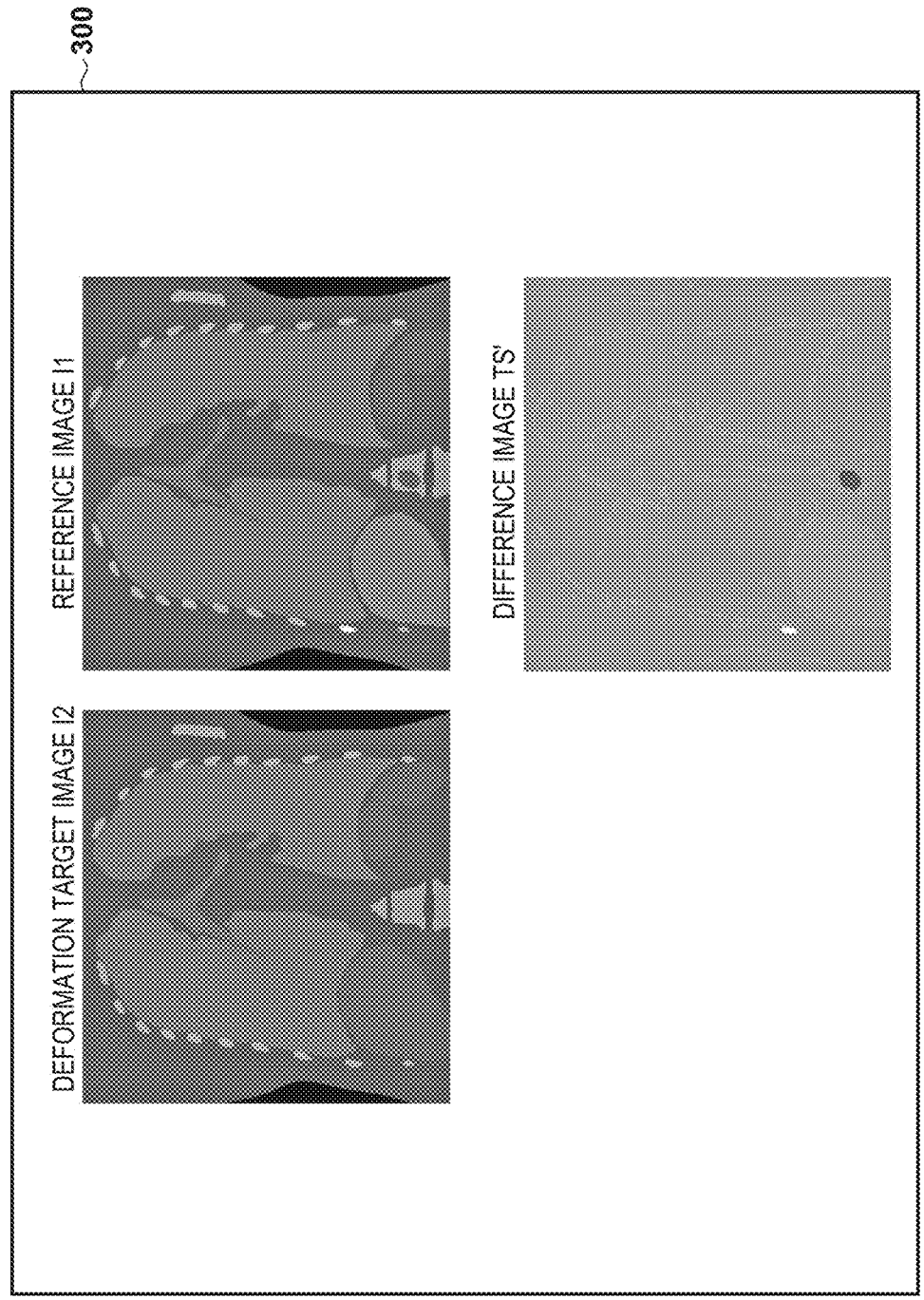
FIG. 6 is a view showing examples of images obtained by the image obtaining unit and a difference image after each pixel value is changed.

In step S107, the pixel value change unit 53 outputs the difference image TS' to the display processing unit 54. As shown in FIG. 6, the display processing unit 54 displays the difference image TS' in the image display region 300 of the display unit 36. The display processing unit 54 controls the display of the display unit 36 to display the difference image TS', the reference image (first image I1), and the deformation target image (second image I2) side by side. The display processing unit 54 can control the display of the display unit 36 to further display the second image (I2').

In the image processing technique according to this embodiment, it is possible to adjust the weight of each pixel value on a difference image, based on the distribution information of pixel values in learning data (distribution information indicating the distribution of pixel values in a region of interest) associated with information (pixel value information) about the range of pixel values of interest of the user and both a reference image and a deformation target image. This processing can enhance a change in a portion of interest and suppress depiction of a change in a portion of non-interest, thereby improving the visibility of the change in the portion of interest of the user.

Modification 1

Although in step S106, the pixel value change unit 53 uses the pixel values of the pixels p in the first image I1 and second image I2' to calculate a weighted coefficient at the pixel p, the pixel values of the neighboring pixels (for example, 6 or 26 neighboring pixels for a three-dimensional image) of the pixel p may be used for calculation. For example, the pixel value change unit 53 can perform processing of changing the pixel value in the difference image based on a likelihood calculated using the pixel values of the pixel and its neighboring pixels in the first image and the pixel values of the pixel and its neighboring pixels in the second image. In calculation of obtaining a likelihood, the formula (equation (1)) is defined using the pixel value given to the pixel. As this value, the output value of image enhancement filter such as a smoothing filter or edge enhancement filter may be used.

Furthermore, if pixels in the region of interest can be extracted by a known region extraction method such as threshold processing or graph cut segmentation, a probability of 1 is given to the extracted region, and a probability of 0 is given to a region outside the extracted region, thereby using the probability as the weighted coefficient W.

Note that the pixel value change unit 53 may normalize the weighted coefficient W within a predetermined range (for example, [0, 1]) based on the minimum value and maximum value of the calculated weighted coefficient W(p).

Modification 2: Variation 1 of Definitional Equation of Weight

In the first embodiment and Modification 1, the weighted coefficient W(p) for changing the pixel value TS(p) in the difference image TS is determined by obtaining a likelihood using pixel values in the two images (first image I1 and second image I2') based on equation (1). As another method, a likelihood is obtained for a distribution defined by a pair of pixel values in the two images, as given by equation (2) below. In Modification 2, the pixel value change unit 53 can perform processing of changing the pixel value in the difference image based on a likelihood calculated using the distribution information ($\theta$) indicating the distribution of the pixel values in the region of interest and a pixel value obtained based on a pair of pixel values in the first and second images.

$$W(P)=Pr(I1(p), I2'(p)|\theta) \quad (2)$$

Although the likelihood based on the univariate normal distribution is used in equation (1), a likelihood based on a bivariate normal distribution is used in equation (2). Similarly to a case in which the univariate normal distribution is used, in this multivariate (two or more variables) normal distribution as well, the pixel value change unit 53 can calculate a likelihood by obtaining, as the distribution information ($\theta$) indicating the distribution of the pixel values, parameters (the average of the variables and a variance-covariance matrix) from learning data. The distribution information ($\theta$) indicating the distribution of the pixel values in equation (2) includes the average value of the pixel values in the region of interest in the first image I1, the average value of the pixel values in the region of interest in the second image I2', and the variance-covariance matrix of the values. The pixel value change unit 53 can calculate, as the distribution information ($\theta$) indicating the distribution of the pixel values, a likelihood using distribution information obtained when capturing the first image and distribution information obtained when capturing the second image. In this case, the pixel value change unit 53 calculates a likelihood using, for the pixel value in the first image I1, the distribution information obtained when capturing the first image, and using, for the pixel value in the second image I2 (I2'), the distribution information obtained when capturing the second image. Note that the pixel value change unit 53 can calculate a likelihood for the pixel values in the first and second images using one of the distribution information obtained when capturing the first image and that obtained when capturing the second image.

As a method using the multivariate normal distribution, it is possible to define a likelihood by combining the output results of an image processing filter for the first and second images in addition to the pixel values of the pixels p in the first image I1 and second image I2'. Furthermore, the neighboring pixel values of the pixels p and the output results of the neighboring pixels by the image processing filter may be used.

Note that this weighted coefficient W may be obtained by normalizing the weighted coefficient W(p) within the predetermined range (for example, [0, 1]) based on the minimum value and maximum value of the calculated value.

Modification 3: Variation 2 of Definitional Equation of Weight

In the first embodiment and Modifications 1 and 2, the likelihood based on the learning data is defined, and the weighted coefficient W(p) for changing the pixel value (p) in the difference image TS is determined. However, the pixel value in the image may be used as a weighted coefficient, as given by equation (3) below. In Modification 3, the pixel value change unit 53 performs processing of changing the pixel value in the difference image based on comparison between the pixel value of each pixel in the first image and that of each pixel in the second image. The pixel value change unit 53 changes the pixel value in the difference image TS using the weighted coefficient W(p) obtained based on the comparison.

$$W(p)=\max(I1(p), I2'(p)) \quad (3)$$

As an example to which equation (3) is applicable, pixel values in a region of interest of the user are relatively larger than those in other regions. More specifically, for example, attention is paid to a bone region in a CT image. It is known that the bone region has an X-ray absorptance higher than those of other regions, and thus pixel values in the bone region in the CT image are relatively larger than those in other regions. Therefore, it is possible to enhance difference values in the bone region in the difference image TS, as compared with other regions, by setting a large weight for a region where the pixel values in the first image I1 or the second image I2' are large.

Note that this weighted coefficient W is desirably calculated to be a value of 0 or more. The weighted coefficient W(p) may be normalized within the predetermined range (for example, [0, 1]) based on the minimum value and maximum value of the calculated value.

In this example, the weighted coefficient W(p) is set so that the weight becomes larger as the pixel value is larger. However, for example, if attention is paid to a region such as lungs in the CT image, the weight may be set larger as the pixel value is smaller. More specifically, for example, by correcting the pixel value so that the minimum value is 1, obtaining its reciprocal, and using it as the weighted coefficient W(p), the weight becomes larger as the pixel value is smaller.

Note that in calculation of equation (3), calculation using the pixel value given to the pixel has been explained. However, the output value of a smoothing filter or edge enhancement filter may be used as the pixel value. Alternatively, the neighboring pixel values of the pixel p and the output results of the neighboring pixels by the image processing filter may be used.

Modification 4: Variation 3 of Definitional Equation of Weight

As a method of setting the weighted coefficient W, which is different from those according to the first embodiment and Modifications 1 to 3, the setting values of the display condition of the image displayed on the display unit 36, such as the window level (WL) and window width (WW) of the image displayed on the display unit 36 in step S101, can be used as follows. The display condition includes a setting value indicating the median value of the pixel value range and a setting value indicating the width of the pixel value range with respect to the median value. In Modification 4, the display processing unit 54 displays the first and second images on the display unit 36, and the pixel value change unit 53 performs processing of changing the pixel value in the difference image based on the display condition of the display unit 36. The pixel value change unit 53 changes the pixel value in the difference image by a weighted coefficient obtained based on the display condition. The display condition includes a setting value indicating the median value of the pixel value range and a setting value indicating the width of the pixel value range with respect to the median value.

In general, a range of pixel values on the screen, which is expressed by grayscale (tones) from black to white, is determined based on the window level (WL) and window width (WW) set as the display condition of the CT image. The window level (WL) is a setting value indicating the median value of the pixel value range to be expressed by grayscale, and the window width (WW) is a setting value indicating the width of the pixel value range to be expressed by grayscale. That is, on the screen, a pixel value of (WL−WW/2) or less is expressed by black, and a pixel value of (WL+WW/2) or more is expressed by white. That is, since pixel values falling outside the pixel value range designated by the window level (WL) and window width (WW) are clipped, even if pixel values in the original image are different, they are expressed by the same black or white on the screen.

By using this, the pixel value change unit 53 performs processing of changing the pixel value in the difference image using the weighted coefficient obtained based on the setting value indicating the median value of the pixel value range and the setting value indicating the width of the pixel value range. If the pixel value in the first image I1 or the second image I2' falls within the range of [WL−WW/2, WL+WW/2], the weighted coefficient W is set to 1; otherwise, the weighted coefficient W is set to 0. Thus, it is possible to extract only the difference within the range of the pixel values of interest of the user. Note that if the settings of the window level (WL) and window width (WW) are different between the first image I1 and the second image I2', the pixel value change unit 53 can use the setting values of the first image I1 serving as a reference in deformable image registration. Note that the pixel value change unit 53 can also use the setting values of the window level (WL) and window width (WW) for the second image I2'. Alternatively, the pixel value change unit 53 can use the pixel value range of an overlapping portion between the pixel value range of interest of the first image I1 and the pixel value range of interest of the second image I2'.

<Second Embodiment> (Pixels Outside a Region of Interest are Extracted, and Used to Change Pixel Values in a Difference Result.)

In the first embodiment, the pixel value change unit changes the pixel values in the difference result using the distribution of the pixel values in the region of interest, the result of extracting the pixels in the region of interest, and the like. To the contrary, the pixel values in the difference result may be changed using the distribution of pixel values outside the region of interest and the extraction result.

This embodiment will explain, for example, a case in which if a bone is set as a region of interest, information in which a region such as a heart or liver outside the region of interest is extracted or enhanced is obtained and pixel values in a difference result are changed based on the information.

The arrangement of an image processing apparatus according to the second embodiment is the same as that according to the first embodiment except that a function is added to a pixel value change unit 53. In the second embodiment, after obtaining the pixel value information of the region of interest of the user, the pixel value change unit 53 obtains information in which a region of non-interest of the user is enhanced or extracted from an input image data group, and changes pixel values in a difference image based on the information, as shown in FIG. 7.

The processing procedure of an image processing apparatus 10 according to the second embodiment will be described with reference to FIGS. 7 to 10 and 11A to 11D.

Figure 7:
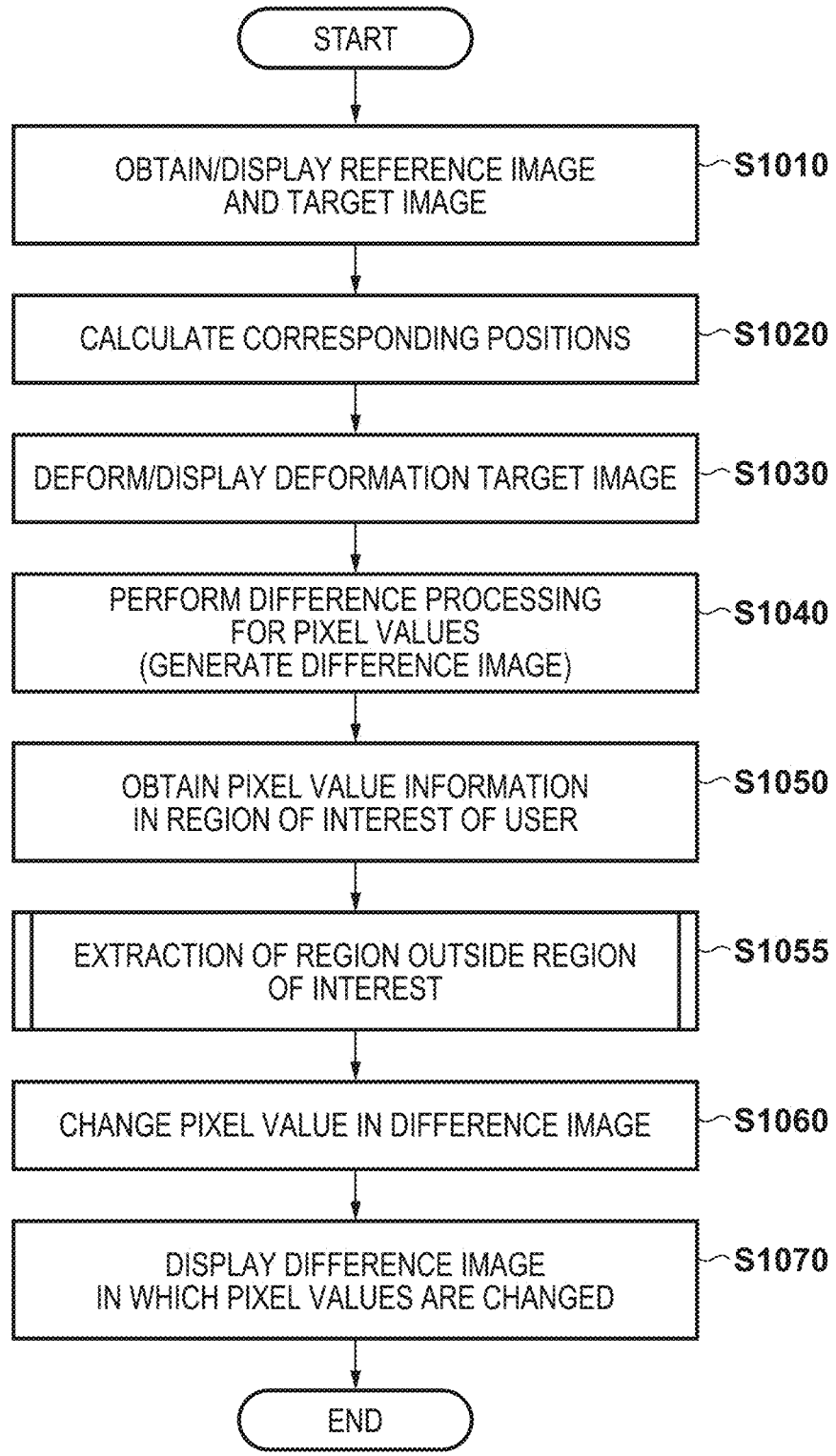
FIG. 7 is a flowchart illustrating an example of the processing procedure of the image processing apparatus.

FIG. 7 is a flowchart illustrating an example of processing which starts from data obtaining processing in the image processing apparatus 10, and displays a difference image in which pixel values are changed. Among steps in this flowchart, in steps S1010 to S1050 and S1070, the same processes as those in steps S101 to S105 and S107 according to the first embodiment shown in FIG. 2 are performed. That is, processes in steps S1055 and S1060 are different from the first embodiment. Only the added processes and the difference from the first embodiment will be described below.

(Step S1055: Extraction of Region Outside Region of Interest)

In step S1055, the pixel value change unit 53 extracts regions of non-interest of the user from both a reference image and a deformed deformation target image. For example, if the region of interest is a bone, organ regions such as a heart and liver are regions outside the region of interest. These regions outside the region of interest are extracted using the characteristics of pieces of pixel value information by, for example, the processing procedure shown in FIG. 8.

As shown in FIG. 4, when compared to the bone structure, the organ structure of a liver has characteristics in which a set of pixels having similar pixel values exist to form a mass. Conversely, as for the bone structure, each bone often has a small, long, and narrow structure, and pixel values of the surface (cortical bone) and inside (cancellous bone) of the bone vary greatly. Therefore, it is possible to extract regions other than a bone region by enhancing a massive region formed by a pixel group having similar pixel values, and extracting the region from the image by a known extraction method such as threshold processing.

From the viewpoint of separating the bone region and the regions other than the bone region in the CT image, the effect of a feature amount for enhancing a massive region based on the continuity of pixel values will be additionally explained. On the CT image, the bone region has high values of about 150 [H.U.] or more. Organ regions such as a heart and liver have pixel values of about 60 [H.U.] or more, but these pixel values may become high by an inspection method (by mainly using a contrast medium). Thus, depending on the contrast imaging conditions, especially the organ regions such as a heart and liver have the distributions of pixel values overlapping the distribution of pixel values in the bone region. Consequently, in some cases, a region extraction method such as threshold processing for the pixel value itself cannot cope with region extraction under various contrast imaging conditions. On the other hand, if a feature amount based on the continuity of the pixel values is calculated, even if the contrast imaging conditions are different, it is possible to obtain a constant calculation value regardless of the contrast imaging conditions as long as the organ region as an extraction target is uniformly dyed. Therefore, by using a feature amount for enhancing a massive region instead of the pixel value in extraction of a liver or heart, it can be expected to obtain a stable region extraction result against differences in contrast imaging conditions.

Figure 8:
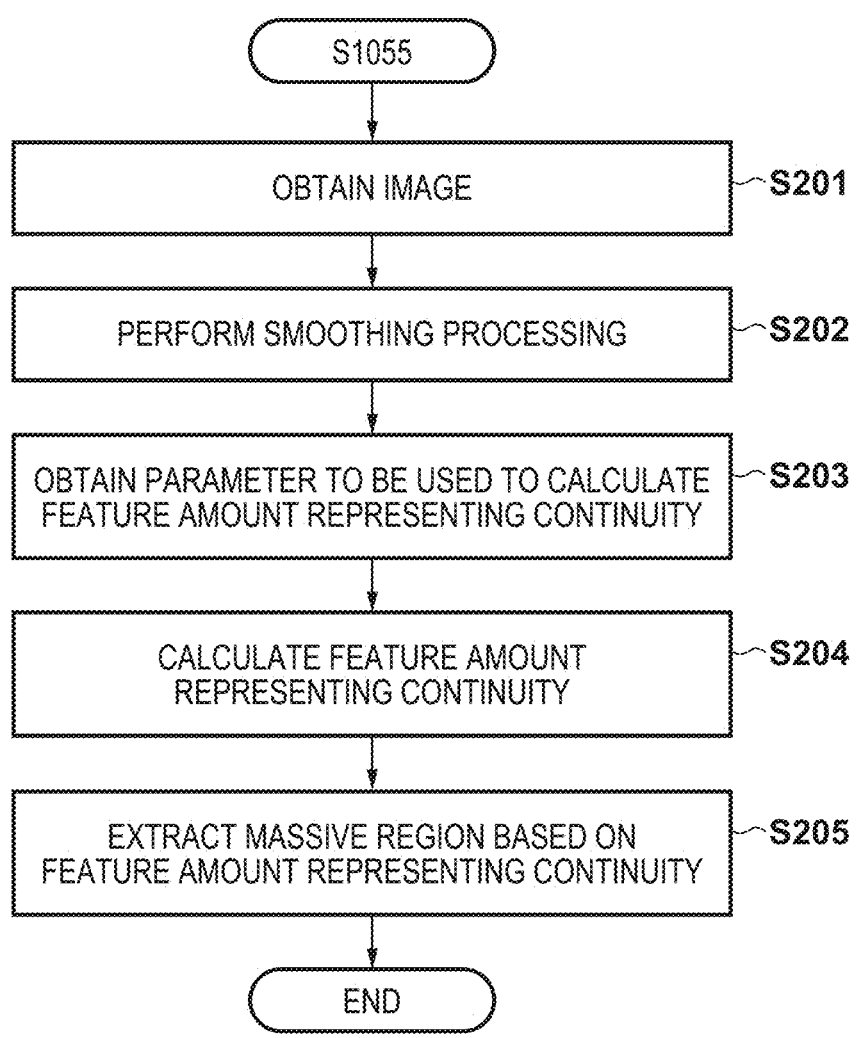
FIG. 8 is a flowchart illustrating a processing procedure of extracting a region outside a region of interest.

In the processing procedure shown in FIG. 8, in step S201, an image of an object is obtained. In step S202, smoothing processing is performed for the image, thereby reducing noise in the image. Note that the processing for the purpose of noise reduction in step S202 may be skipped. After that, in step S203, a parameter (threshold) for evaluating the similarity between pixel values is obtained. The parameter (threshold) can be used to calculate a feature amount representing continuity. More specifically, a predetermined parameter may be used, or the parameter may be input by the user via an operation unit 35. Alternatively, the parameter may be automatically determined from the variance of pixel values in the image. If the parameter is automatically determined in this way, it is desirable to set the value of the parameter (threshold) to be larger as the variance is larger. In step S204, a feature amount representing the continuity of pixel values is calculated, and a massive region included in the image is enhanced. The pixel value change unit 53 sets, for a pixel of interest in the image, a plurality of predetermined paths passing through the pixel of interest, calculates, in each of the paths, an evaluation value representing the continuity of pixel values on each path based on the similarity between adjacent pixel values on the path, and obtains the feature amount of the pixel of interest based on the evaluation value obtained for each path (obtaining of feature amount). The pixel value change unit 53 further calculates, based on the obtained feature amount, a likelihood that the pixel of interest is in the massive region. In step S205, the pixel value change unit 53 functions as an extraction unit for extracting a region from the image, and extracts the massive region as a region other than the bone region using a known extraction method such as threshold processing or graph cut segmentation.

As a method of enhancing the massive region in step S204, for example, a method is considered in which when attention is paid to a given pixel in the image, the number of similar pixels continuously existing on a predetermined path passing through the given pixel is calculated. In this example, the number of predetermined paths is one or more but it is desirable to use a plurality of paths to enhance the massive region. Especially, it is desirable that at least a path is set for each axial direction of the image. That is, it is desirable that at least a path is set for each of three axial directions when the image is three-dimensional, and at least a path is set for each of two axial directions when the image is two-dimensional.

Note that to calculate a feature amount about the continuity of the pixel values, a pixel (pixel of interest) set as a calculation target may be limited in advance. More specifically, a method is considered in which a threshold is provided for the pixel values and a feature amount is calculated for a pixel having a pixel value equal to or larger than the threshold (or a pixel value equal to or smaller than the threshold, or a pixel value smaller than the threshold). Consider a case in which if a bone in a CT image is set as a region of interest, regions such as a heart and liver outside the region of interest are extracted or enhanced. In the example according to this embodiment, the following calculation need not be performed for a pixel having a pixel value (for example, −100 [H.U.] or less) which is not held by pixels in the organic regions. By skipping the calculation, the following feature amount calculation processing can be speeded up. Especially, it is effective to set, as a calculation target (pixel of interest), a pixel in the range of the pixel values, which has been obtained in step S1050 and to which the user pays attention.

An example of the processing of enhancing the massive region will be described with reference to FIGS. 9 to 10 and 11A to 11D.

Figure 9:
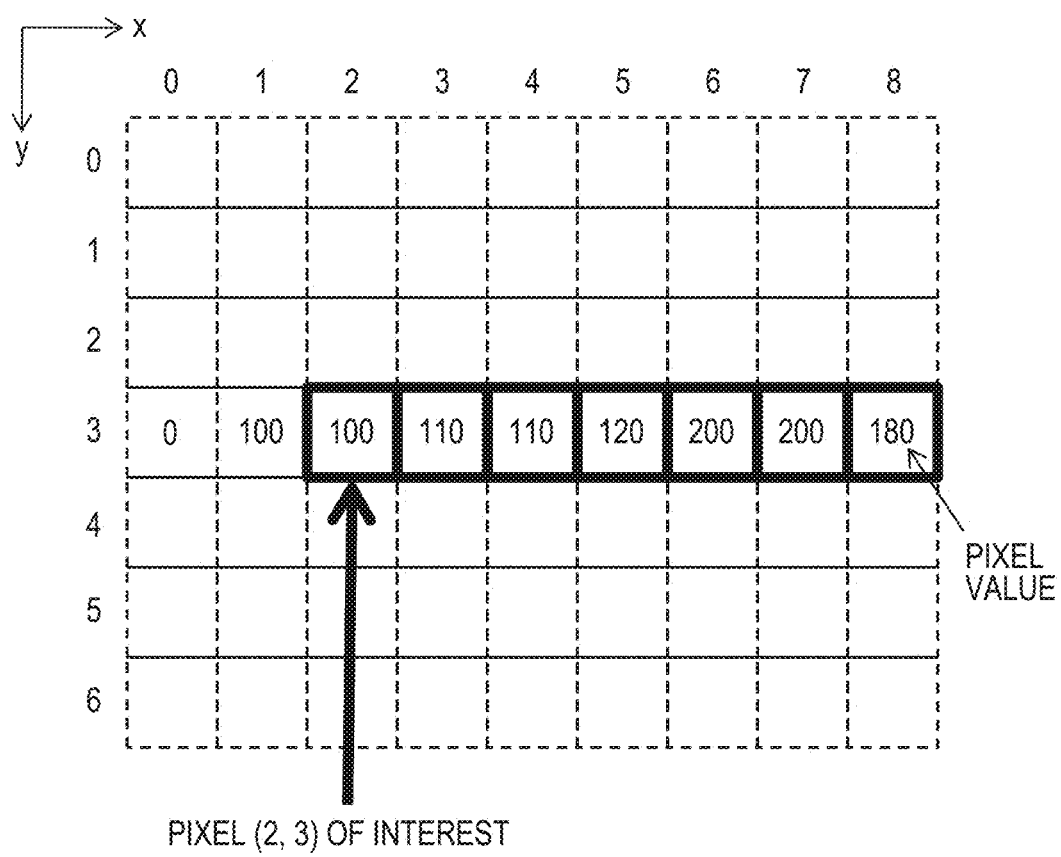
FIG. 9 is a view for explaining an example of processing of enhancing a massive region.
Figure 11A:
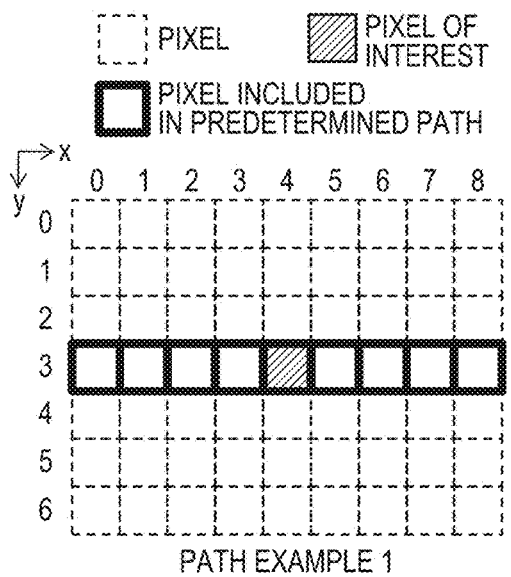
FIGS. 11A to 11D are views for explaining an example of processing of enhancing a massive region.
Figure 11B:
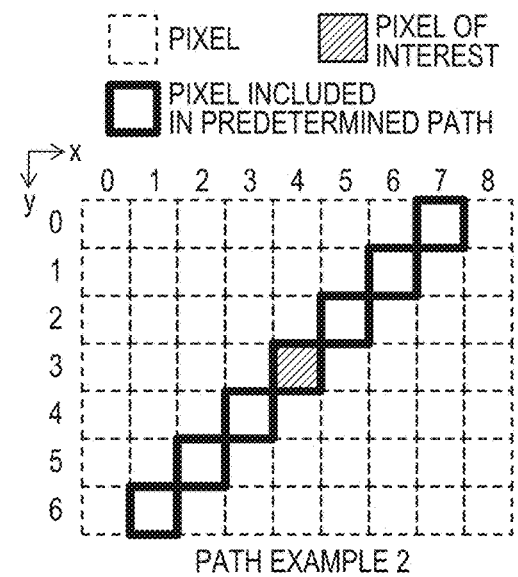
Figure 11C:
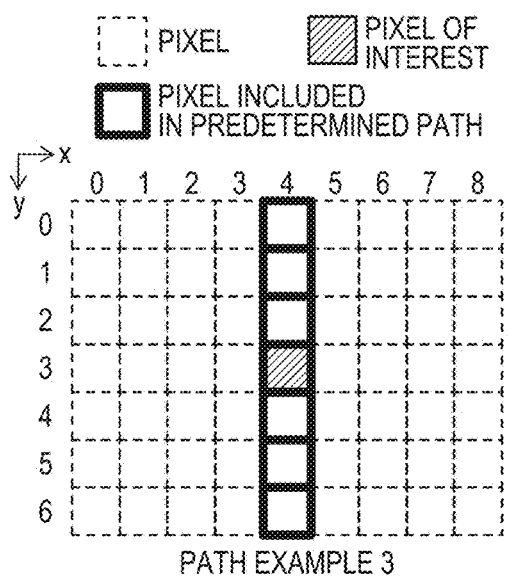
Figure 11D:
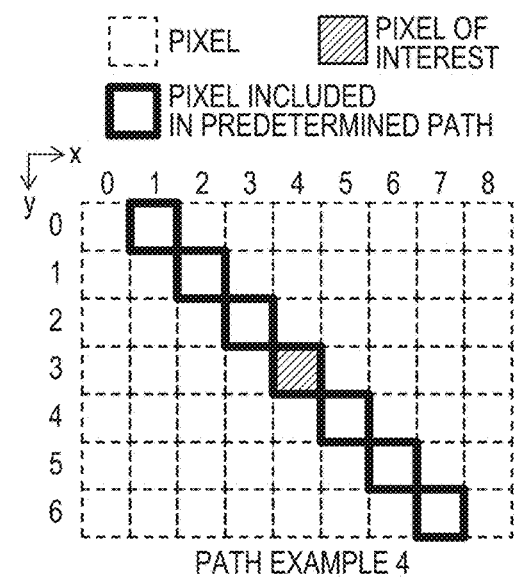

A method of calculating the continuity of density values in a case shown in FIG. 9 will be described. FIG. 9 shows a case in which a set of pixels surrounded by thick lines represents a predetermined path and a pixel of interest is a pixel at x- and y-coordinates (2, 3). Note that a numerical value described in each pixel shown in FIG. 9 represents the pixel value of the pixel. In this case, a method will be described below in which the number of similar pixels continuously existing on the predetermined path passing through the pixel of interest is calculated.

As shown in FIG. 10, when calculating the feature amount, calculation starts with the pixel (2, 3) of interest. First, the pixel value of the pixel (2, 3) of interest is compared with that of an adjacent pixel (3, 3). If the absolute value of the difference between the pixel values is smaller than the parameter (threshold) obtained in step S203, the pixel values are determined to be continuous, and the calculation advances to the next step. In the example of FIG. 10, the pixel values of the pixels (2, 3) and (3, 3) as targets in the first calculation are 100 and 110, and the absolute value of the difference between the pixel values is 10. If the threshold obtained in step S203 is 20, the comparison result of the pixel values is smaller than the threshold, and thus it is determined that the pixels (2, 3) and (3, 3) have continuity. In this case, at this stage, the value of the width for one pixel as the distance between the pixels (2, 3) and (3, 3) is temporarily stored as the feature amount (evaluation value) of the continuity. After that, as long as the continuity of the pixels continues, a pair of pixels as calculation targets is slid and calculation is repeatedly executed. As a practical example, the next calculation step after it is determined in the calculation for the pair of the pixels (2, 3) and (3, 3) that the pixels have continuity will be described. In the next calculation step in this case, the pair of pixels is slid to set the pixel (3, 3) and a pixel (4, 3) as targets, and their pixel values are compared in the same manner as that described above. In the second calculation, the pixel values of the pixels (3, 3) and (4, 3) as calculation targets are both 110, and the absolution value of the difference between the pixel values is 0. Therefore, since the absolute value is smaller than 20 as the threshold obtained in step S203, it is determined that the pixels (3, 3) and (4, 3) have continuity. Then, the width for one pixel is added to the already recorded feature amount of the continuity, thereby updating the value of the feature amount of the continuity to a width for two pixels. Such calculation is repeatedly performed, and calculation continues until the absolute value of the difference between pixel values is equal to or larger than the threshold at the time of comparison between the pixel values. In the case of FIG. 10, the pixel values of pixels as calculation targets in the fourth calculation are 120 and 200, the absolute value (=80) of the difference between the pixel values is larger than the threshold (=20), and thus the calculation is stopped at this time. A value corresponding to a width for three pixels is stored in a pixel of interest as the feature amount of the continuity of the pixel values. Note that the unit of the width of the continuity may be "pixels" or an actual size such as "mm". Furthermore, FIG. 10 shows an example in which the continuity is searched for on the positive side in the x direction. However, the continuity may be searched for on the negative side or on both sides. By performing the above calculation for all the pixels in the image, it is possible to calculate, for each pixel, a feature amount representing the continuity of the pixel values.

Note that the continuity of the pixel values is determined using the absolute value of the difference between adjacent pixels. However, another index may be used to determine the continuity. For example, the continuity may be determined depending on whether the ratio between the pixel values of adjacent pixels is equal to or lower than a threshold. Alternatively, the continuity may be determined based on the pixel values of the plurality of pixels included in the predetermined path. For example, when determining the continuity from the pixel (2, 3) to a pixel (5, 3) in FIG. 9, the variance of the pixel values of the pixels (2, 3), (3, 3), (4, 3), and (5, 3) may be used. In this case, if the value of the variance of the pixel values is smaller than a given threshold, it can be determined that the pixels have continuity.

Furthermore, as another continuity determination condition, a condition that when a pixel having a pixel value equal to or larger than a given threshold (or a pixel value equal to or smaller than the given threshold or a pixel value smaller than the given threshold) is reached, the calculation of the continuity is stopped is considered. Especially, if the pixel value of a pixel as a calculation target reaches a value outside the range of the pixel values of interest of the user, which has been obtained in step S1050, the calculation may be stopped. Each of these continuity determination conditions need not be used solely, and a combination of the plurality of conditions may be used.

The predetermined path used to calculate a feature amount representing the continuity of the pixel values may be an arbitrary path in the three-dimensional space as long as the path passes through the pixel of interest. Furthermore, if a plurality of predetermined paths are used, a feature amount calculated for each of the predetermined paths may be set as multivalued vector data and held as the feature amount of the pixel of interest. Alternatively, the value of one feature amount may be obtained by calculating the sum of the feature amounts of the continuity which have been individually calculated using the plurality of predetermined paths, and set as the feature amount of the pixel of interest. Representative examples of the predetermined path are examples shown in FIGS. 11A to 11D. Because of space limitations, FIGS. 11A to 11D show an example in which paths in four directions including the positive and negative directions of eight neighboring pixels of the pixel of interest on a two-dimensional plane are set as predetermined paths. In this embodiment, a method can be used in which the same method as this method is extended in the three-dimensional space and 13 directions including the positive and negative directions of 26 neighboring pixels are set as predetermined paths. Note that the predetermined path may be set from the pixel of interest to the edges of the image. If the body region of the object in the image is known, the predetermined paths are desirably set in only the body region. Alternatively, the length of the predetermined path may be limited to a length shorter than a predetermined one, and no calculation may be performed for a length equal to or longer than the predetermined one.

When the pixel values uniformly exist along the predetermined path, the output of the feature amount representing the continuity of the pixel values tends to be large. Thus, if there exists a massive region formed by a group of pixels having similar pixel values, such as a liver or heart, the output value of the feature amount becomes large in each of a plurality of paths. Conversely, for a region having a narrow shape such as a rib, the output value becomes large in only the path along the shape, and becomes small in each of the remaining paths. By using this, the feature amount representing the continuity of the pixel values is calculated for each path using the plurality of predetermined paths, and the results are used in combination, thereby making it possible to enhance a massive region (a region other than the bone region) such as a liver. As a method of combining the calculation results of the feature amounts for the plurality of paths, there may be a method of obtaining an average value, a median value, a maximum value, a minimum value, the difference or ratio between the minimum and maximum values, or a variance value.

Note that a method of calculating, based on the feature amounts of the plurality of paths, the likelihood that the pixel of interest is in a region to be extracted (a method of enhancing a massive region) is not limited to the above method, and may be formed using a technique such as machine learning. For example, in a learning case in which a region to be extracted has already been defined, a discriminator for calculating a feature amount for each path and determining based on the feature amounts whether the pixel of interest is in a region to be extracted is created by learning. At this time, the feature amounts may be converted into rotation-invariant feature amounts, and learning may be performed based on the converted values. Then, the region of the image may be extracted using the created discriminator. Note that an example of the calculation method for converting the feature amounts into rotation-invariant feature amounts is a method of setting, as an X-axis direction, one of all the paths in which the feature amount is maximum and setting, as a Y-axis direction, a path, among paths orthogonal to the path, in which the feature amount is maximum.

In step S205, the massive region (the region other than the bone region) enhanced in step S204 is extracted by the known extraction method such as threshold processing or graph cut segmentation. Note that in this extraction processing, in each pixel, in addition to the feature amount for enhancing the massive region, the pixel value itself or another feature amount may be used in combination.

With the above processing, in each pixel in the image, a feature amount representing the continuity of the pixel values is calculated based on the similarity between adjacent pixel values on each path using the plurality of predetermined paths passing through the pixel, and a region is extracted based on the feature amounts, thereby making it possible to extract the massive region other than the bone region, which includes pixel values close to those in the bone region. That is, the problem that the pixel values of the bone are close to those of an organ having undergone contrast imaging and it is thus difficult to discriminate based on the pixel values between the bone and the organ can be solved by the above-described method using the feature amounts each representing the continuity.

(Step S1060: Change of Pixel Value in Difference Image)

In step S1060, the pixel value change unit 53 can give a probability of 0 to the region extracted in step S1055, and give a probability of 1 to a region outside the extracted region, thereby using the probability as the weighted coefficient W. Alternatively, in addition to the weighted coefficient W according to the first embodiment, the extraction result of a pixel outside the region of interest may be used as a second weighted coefficient W2. That is, the pixel value change unit 53 can change the pixel value in the difference image using the plurality of weighted coefficients by calculating $TS(p) \times W(p) \times W2(p)$ using the difference value $TS(p)$ of the pixel p in the difference image TS, the weighted coefficient $W(p)$, and the second weighted coefficient $W2(p)$. A combination of the plurality of weighted coefficients may be linear combination like $TS(p) \times (W(p) + W2(p))$.

Note that a case in which a pixel outside the region of interest is extracted has been described above. However, the weighted coefficient W2 may be obtained from the value of the feature amount representing the continuity of the pixel values. In this embodiment in which the bone region is set as a region of interest, it is preferable to make a setting so that the weighted coefficient by which the pixel value in the difference image is multiplied becomes smaller (close to 0) as the value of the feature amount is larger and the weighted coefficient becomes larger (close to 1) as the value of the feature amount is smaller. Note that in this case, the region extraction processing in step S205 may be skipped. By setting the weighted coefficient in this way, it can be expected to have the effect of relatively decreasing the difference values in the massive region such as a heart or liver outside the region of interest when attention is paid to the difference values of the bone.

In the image processing technique according to this embodiment, it is possible to adjust the weight of the pixel value on the difference image based on information about a region of non-interest of the user. This processing can suppress depiction of a change in the portion of the region of non-interest of the user, thereby improving the visibility of a change in a portion of interest of the user.

Note that the feature amount calculation method of the massive region described in step S1055 according to the above embodiment can be used for a purpose other than that of improving the visibility of the region of interest on the difference image. For example, for another purpose of extracting/analyzing an organ region such as a heart or liver of a medical image, a feature amount representing a likelihood of being the organ region can be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-080477, filed Apr. 13, 2016, and Japanese Patent Application No. 2016-170070, filed Aug. 31, 2016, which are hereby incorporated by reference herein in their entirety.

What is claimed is:

1. An image processing apparatus comprising:
a memory configured to store instructions; and
a processor configured to execute the instructions to provide:
an obtaining unit configured to obtain a first image of an object and a second image of the object;
a difference processing unit configured to generate a difference image after the first image and the second image are registered by obtaining pixel values at corresponding positions from the registered first image and the registered second image and performing difference processing for the obtained pixel values; and
a pixel value change unit configured to perform processing of changing a pixel value in the difference image based on a larger one of a likelihood calculated using a pixel value in the first image and distribution information indicating a distribution of pixel values in a region of interest and a likelihood calculated using a pixel value in the second image and the distribution information indicating the distribution of the pixel values in the region of interest.

2. The apparatus according to claim 1, wherein the pixel value change unit performs the processing of changing the pixel value in the difference image based further on a likelihood calculated using a pixel value of a pixel and pixel values of neighboring pixels of the pixel in the first image, and a pixel value of a pixel and pixel values of neighboring pixels of the pixel in the second image.

3. The apparatus according to claim 1, wherein the pixel value change unit performs the processing of changing the pixel value in the difference image based further on a likelihood calculated using distribution information indicating a distribution of pixel values in a region of interest and a pixel value obtained based on a pair of a pixel value in the first image and a pixel value in the second image.

4. The apparatus according to claim 1,
wherein the processor is configured to execute further instructions to provide a deformation unit configured to register the first image and the second image by deforming the second image based on a correspondence between a position of each pixel in the first image and a position of each pixel in the second image so that each pixel in the second image matches a corresponding pixel in the first image.

5. The apparatus according to claim 4, wherein the difference processing unit obtains pixel values at corresponding positions from the registered images, and obtains the difference image by performing difference processing for the obtained pixel values.

6. The apparatus according to claim 1,
wherein the processor is configured to execute further instructions to provide a display processing unit configured to display the first image and the second image on a display, and
wherein, for each pixel in the difference image, the pixel value change unit obtains pixel value information about a range of pixel values in a region of interest based on a display condition of the display.

7. The apparatus according to claim 6, wherein the pixel value change unit obtains the pixel value information about the range of the pixel values in the region of interest based on a display condition of at least one of the first image and the second image.

8. The apparatus according to claim 6, wherein the pixel value change unit changes distribution information indicating a distribution of the pixel values in the region of interest based on the pixel value information.

9. The apparatus according to claim 8, further comprising:
a storage configured to store the distribution information indicating the distribution of the pixel values in the region of interest,
wherein the storage stores a plurality of pieces of distribution information corresponding to the region of interest of the object, and
the pixel value change unit sets the distribution information based on the distribution information obtained from the storage unit based on the pixel value information.

10. The apparatus according to claim 1, wherein, for each pixel in the difference image, the pixel value change unit obtains pixel value information about a range of pixel values in a region of interest based on information input via an operation unit.

11. The apparatus according to claim 1, wherein the pixel value change unit changes the pixel value in the difference image using a weighted coefficient obtained based on the likelihood.

12. The apparatus according to claim 1, wherein the first image and the second image are images obtained at different timings.

13. The apparatus according to claim 1, wherein the region of interest includes a bone.

14. An image processing apparatus comprising:
a memory configured to store instructions; and
a processor configured to execute the instructions to provide:
an obtaining unit configured to obtain a first image of an object and a second image of the object;
a difference processing unit configured to generate a difference image after the first image and the second image are registered by obtaining pixel values at corresponding positions from the registered first image and the registered second image and performing difference processing for the obtained pixel values; and
a pixel value change unit configured to perform processing of changing a pixel value in the difference image using a weighted coefficient obtained based on comparison between a pixel value of each pixel in the first image and a pixel value of each pixel in the second image.

15. An image processing apparatus comprising:
a memory configured to store instructions; and
a processor configured to execute the instructions to provide:
an obtaining unit configured to obtain a first image of an object and a second image of the object;
a difference processing unit configured to generate a difference image after the first image and the second image are registered by obtaining pixel values at corresponding positions from the registered first image and the registered second image and performing difference processing for the obtained pixel values;
a display processing unit configured to display the first image and the second image on a display unit; and
a pixel value change unit configured to perform processing of changing a pixel value in the difference image using a weighted coefficient obtained based on a display condition of the display unit.

16. The apparatus according to claim 15, wherein
the display condition includes a setting value indicating a median value of a pixel value range and a setting value indicating a width of the pixel value range with respect to the median value, and
the pixel value change unit performs the processing of changing the pixel value in the difference image using a weighted coefficient obtained based on the setting value indicating the median value of the pixel value range and the setting value indicating the width of the pixel value range.

17. An image processing method comprising:
obtaining a first image of an object and a second image of the object;
generating a difference image after the first image and the second image are registered by obtaining pixel values at corresponding positions from the registered first image and the registered second image and performing difference processing for the obtained pixel values; and
performing processing of changing a pixel value in the difference image based on a larger one of a likelihood calculated using a pixel value in the first image and distribution information indicating a distribution of pixel values in a region of interest and a likelihood calculated using a pixel value in the second image and the distribution information indicating the distribution of the pixel values in the region of interest.

18. An image processing apparatus comprising:
a memory configured to store instructions; and
a processor configured to execute the instructions to provide:
   an obtaining unit configured to obtain an image of an object; and
   a feature amount obtaining unit configured to:
      set, for a pixel of interest in the image, a plurality of predetermined paths passing through the pixel of interest;
      calculate, for each of the paths, an evaluation value representing continuity of pixel values on the path based on similarity between adjacent pixel values on the path; and
      obtain a feature amount of the pixel of interest based on the evaluation values obtained for the respective paths; and
   an extraction unit configured to extract a region from the obtained image based on the obtained feature amount.

19. The apparatus according to claim 18, wherein the paths are set to include respective axial directions of the image.

20. The apparatus according to claim 18, wherein the feature amount obtaining unit further calculates, based on the feature amount, a likelihood that the pixel of interest is in a massive region.

21. A computer-readable storage medium storing a program for causing a computer to execute steps of an image processing method, the method comprising:
   obtaining a first image of an object and a second image of the object;
   generating a difference image after the first image and the second image are registered by obtaining pixel values at corresponding positions from the registered first image and the registered second image and performing difference processing for the obtained pixel values; and
   performing processing of changing a pixel value in the difference image based on a larger one of a likelihood calculated using a pixel value in the first image and distribution information indicating a distribution of pixel values in a region of interest and a likelihood calculated using a pixel value in the second image and the distribution information indicating the distribution of the pixel values in the region of interest.

22. An image processing apparatus comprising:
a memory configured to store instructions; and
a processor configured to execute the instructions to provide:
   an obtaining unit configured to obtain a first image of an object and a second image of the object;
   a deformation unit configured to register the first image and the second image by deforming the second image based on a correspondence between a position of each pixel in the first image and a position of each pixel in the second image so that each pixel in the second image matches a corresponding pixel in the first image;
   a difference processing unit configured to generate a difference image after the first image and the second image are registered; and
   a pixel value change unit configured to perform processing of changing a pixel value in the difference image based on a likelihood calculated using a pixel value in the first image and a pixel value in the second image.

23. The apparatus according to claim 22, wherein the difference processing unit generates pixel values at corresponding positions from the registered images, and generates the difference image by performing difference processing for the generated pixel values.

24. An image processing apparatus comprising:
a memory configured to store instructions; and
a processor configured to execute the instructions to provide:
   an obtaining unit configured to obtain a first image of an object and a second image of the object;
   a difference processing unit configured to generate a difference image after the first image and the second image are registered; and
   a pixel value change unit configured to perform processing of changing a pixel value in the difference image based on a likelihood calculated using a pixel value in the first image and a pixel value in the second image,
   wherein the pixel value change unit changes the pixel value in the difference image using a weighted coefficient obtained based on the likelihood.

25. An image processing apparatus comprising:
a memory configured to store instructions; and
a processor configured to execute the instructions to provide:
   an obtaining unit configured to obtain a first image of an object and a second image of the object, wherein the first image and the second image are images obtained at different timings;
   a difference processing unit configured to generate a difference image after the first image and the second image are registered; and
   a pixel value change unit configured to perform processing of changing a pixel value in the difference image based on a likelihood calculated using a pixel value in the first image and a pixel value in the second image.

26. An image processing method comprising:
   obtaining a first image of an object and a second image of the object, wherein the first image and the second image are images obtained at different timings;
   generating a difference image after the first image and the second image are registered; and
   performing processing of changing a pixel value in the difference image based on a likelihood calculated using a pixel value in the first image and a pixel value in the second image.

27. A non-transitory computer-readable storage medium storing a program for causing a computer to execute steps of an image processing method, the method comprising:
   obtaining a first image of an object and a second image of the object, wherein the first image and the second image are images obtained at different timings;
   generating a difference image after the first image and the second image are registered; and
   performing processing of changing a pixel value in the difference image based on a likelihood calculated using a pixel value in the first image and a pixel value in the second image.

28. An image processing apparatus comprising:
a memory configured to store instructions; and
a processor configured to execute the instructions to provide:
   an obtaining unit configured to obtain a first image of an object and a second image of the object, wherein the first image and the second image are images obtained at different timings;

a difference processing unit configured to generate a difference image after the first image and the second image are registered; and a pixel value change unit configured to perform processing of changing a pixel value in the difference image based on comparison between a pixel value of each pixel in the first image and a pixel value of each pixel in the second image.

29. An image processing apparatus comprising:

a memory configured to store instructions; and a processor configured to execute the instructions to provide:

an obtaining unit configured to obtain a first image of an object and a second image of the object, wherein the first image and the second image are images obtained at different timings;

a difference processing unit configured to generate a difference image after the first image and the second image are registered;

a display processing unit configured to display the first image and the second image on a display unit; and a pixel value change unit configured to perform processing of changing a pixel value in the difference image based on a display condition of the display unit.

* * * * *